(12) United States Patent
Chertkow

(10) Patent No.: US 6,658,177 B1
(45) Date of Patent: Dec. 2, 2003

(54) SWITCHING DEVICE AND METHOD OF FABRICATING THE SAME

(75) Inventor: Igal Roberto Chertkow, Ahsdod (IL)

(73) Assignee: Memlink Ltd., Herzelia (IL)

( * ) Notice: Subject to any disclaimer, the term of this patent is extended or adjusted under 35 U.S.C. 154(b) by 448 days.

(21) Appl. No.: 09/619,014

(22) Filed: Jul. 19, 2000

Related U.S. Application Data

(63) Continuation-in-part of application No. PCT/US00/03354, filed on Feb. 10, 2000.
(60) Provisional application No. 60/170,482, filed on Dec. 13, 1999, and provisional application No. 60/170,494, filed on Dec. 13, 1999.

(51) Int. Cl.[7] .................................................. G02B 6/26
(52) U.S. Cl. ............................. 385/18; 385/17; 385/20
(58) Field of Search ....................... 385/16–20; 349/196, 349/197; 710/131

(56) References Cited

U.S. PATENT DOCUMENTS

| | | | |
|---|---|---|---|
| 3,503,670 A | 3/1970 | Kosanke et al. ............. 350/150 |
| 4,703,215 A | 10/1987 | Asano ......................... 310/328 |
| 4,927,230 A | 5/1990 | Tokumitsu ............... 350/96.24 |
| 4,991,924 A | * 2/1991 | Shankar et al. ............. 349/196 |
| 5,208,880 A | 5/1993 | Riza et al. |
| 5,479,064 A | 12/1995 | Sano ........................... 310/328 |
| 5,742,712 A | 4/1998 | Pan et al. ...................... 385/18 |
| 5,774,604 A | 6/1998 | McDonald |
| 5,878,177 A | 3/1999 | Karasan et al. |
| 5,889,600 A | 3/1999 | McGuire |
| 5,914,801 A | 6/1999 | Dhuler et al. ................. 359/230 |
| 5,923,798 A | 7/1999 | Aksyuk et al. |
| 5,943,454 A | 8/1999 | Aksyuk et al. |
| 5,960,132 A | 9/1999 | Lin |
| 5,962,949 A | 10/1999 | Dhuler et al. |
| 5,963,682 A | 10/1999 | Dorschner et al. ............ 385/16 |
| 5,987,027 A | 11/1999 | Park et al. |
| 5,995,688 A | 11/1999 | Aksyuk et al. |
| 5,998,906 A | 12/1999 | Jerman et al. |
| 6,002,818 A | 12/1999 | Fatehi et al. |
| 6,031,946 A | 2/2000 | Bergmann et al. |
| 6,038,073 A | 3/2000 | Ono |
| 6,040,935 A | 3/2000 | Michalicek |
| 6,061,482 A | 5/2000 | Davis |
| 6,091,867 A | * 7/2000 | Young et al. .................. 385/17 |
| 6,134,042 A | 10/2000 | Dhuler et al. ................. 359/224 |

OTHER PUBLICATIONS

Motamedi et al.,"Micro–opto–electro–mechanical devices and on–chip optical processing" *Optical Engineering* 36(5) 1282–1297 May 1997.

Hecht, "Optical switching promises cure for telecommunications logjam", *Laser Focus World*, Sep. 1998.

Toshiyoshi et al., "Electrostatic Micro Torsion Mirrors for an Optical Switch Matrix", *Journal of MEMS* vol. 5, No. 4, Dec. 1996.

Marxer et al.,"Vertical Mirrors Fabricated by Deep Reactive Ion Etching for Fiber Optic Switching Applications", *Journal of MEMS*, vol. 6, No. 3, Sep. 1997.

(List continued on next page.)

Primary Examiner—Hung N. Hgo
(74) Attorney, Agent, or Firm—Pennie & Edmonds LLP

(57) ABSTRACT

A switching device that receives a plurality of input signals and provides a plurality of output signals has switches arranged in a two- or three-dimensional array configurations. At least two of the switches, which are preferably microelectromechanical or MEMS switches, reside on distinct physical substrate layers in the switching device, and at least one of the signals travels through a penetrable zone of one of the physical substrate layers. Three dimensional switching device blocks can be conveniently arranged in a Clos configuration or other switching configurations to reduce blocking and avoid rearrangement. The switching devices may be used to switch optical signals and may include mirrors as switching elements.

68 Claims, 25 Drawing Sheets

OTHER PUBLICATIONS

Ye et al., "Optimal Shape Design of an Electrostatic Comb Drive in Microelectromechanical Systems" *Journal of MEMS,* vol. 7, No. 1, Mar. 1998.

Akiyama et al., "Scratch Drive Actuator with Mechanical Links for Self-Assembly of Three-Dimensional MEMS", *Journal of MEMS,* vol. 6, No. 1, Mar. 1997.

Petersen, "Silicon as a Mechanical Material", *Proceedings of the IEEE,* vol. 70, No. 5, May 1982.

Dickensheets et al, "Silicon Micromachined Scanning Confocal Optical Microscope", *Journal of MEMS,* vol. 7, No. 1 Mar., 1998.

* cited by examiner

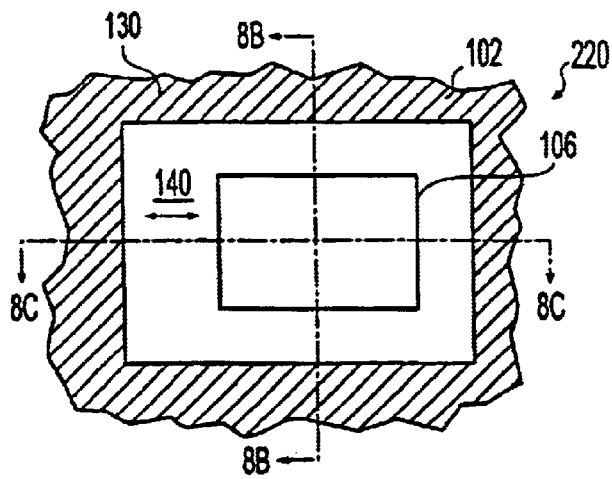
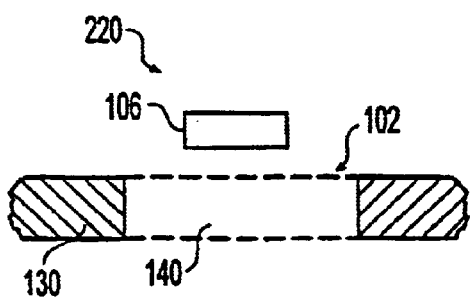
FIG. 8A  FIG. 8B
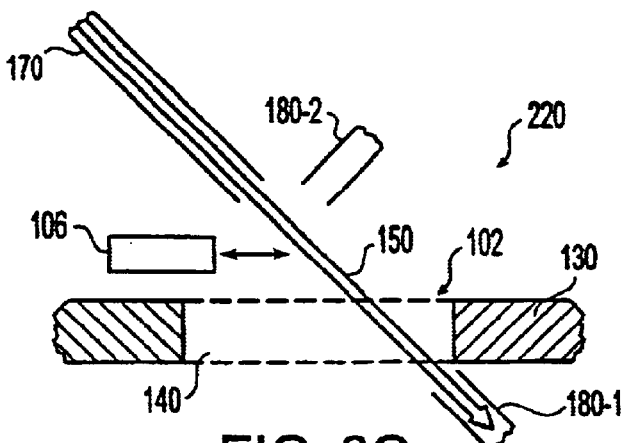
FIG. 8C
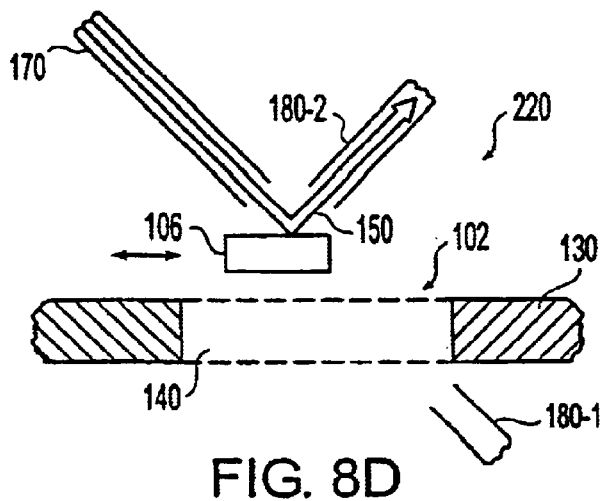
FIG. 8D

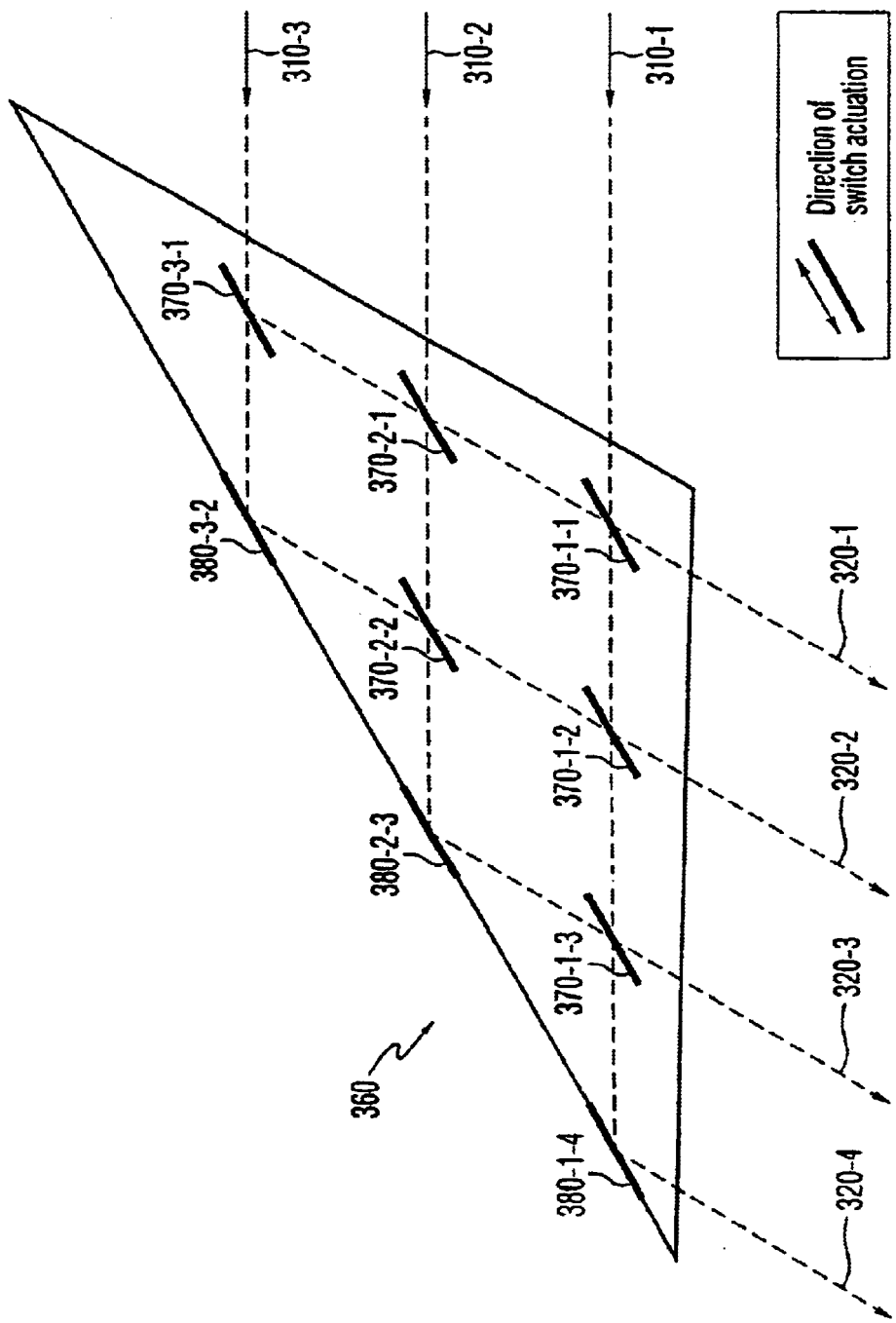

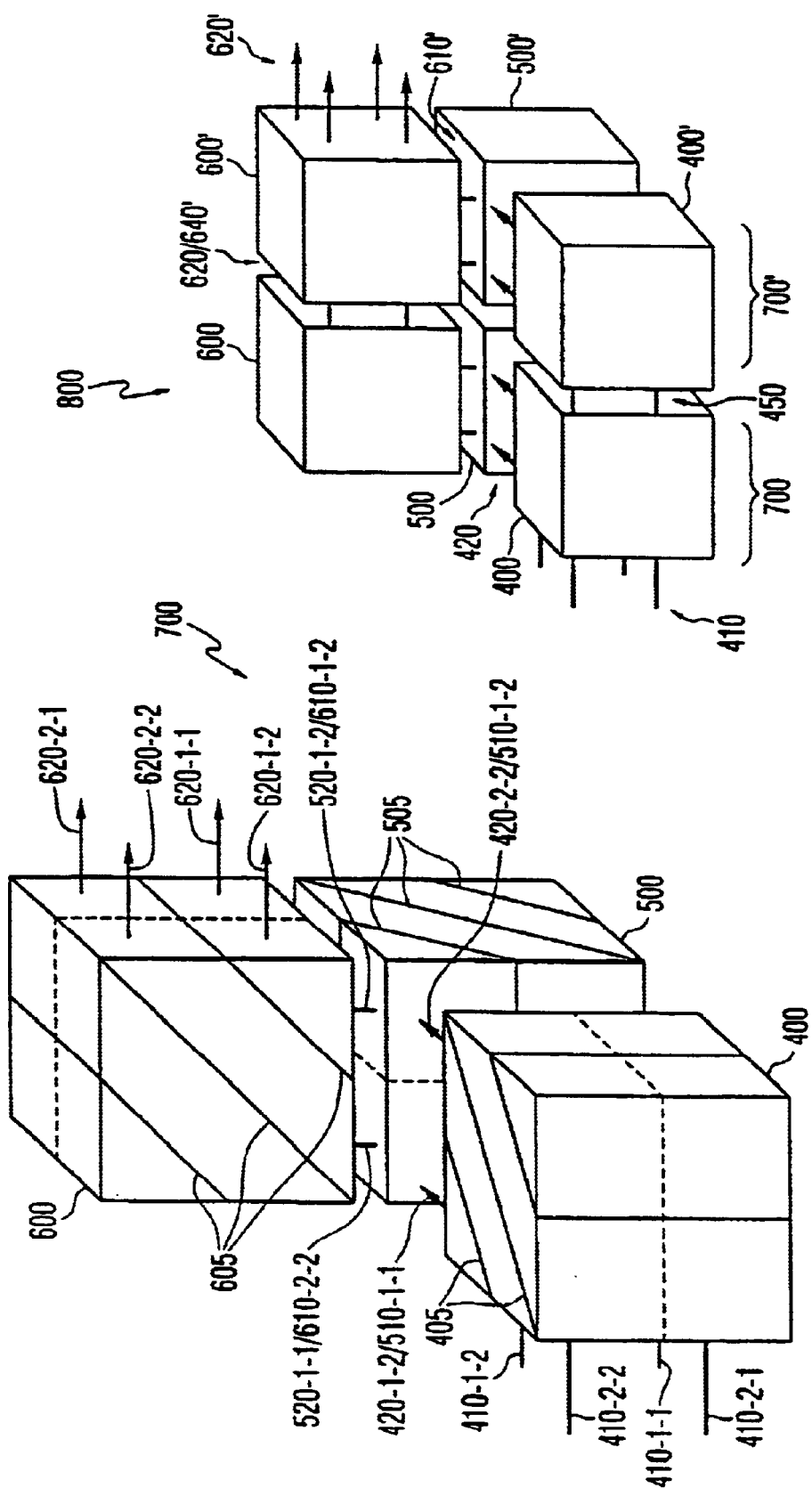

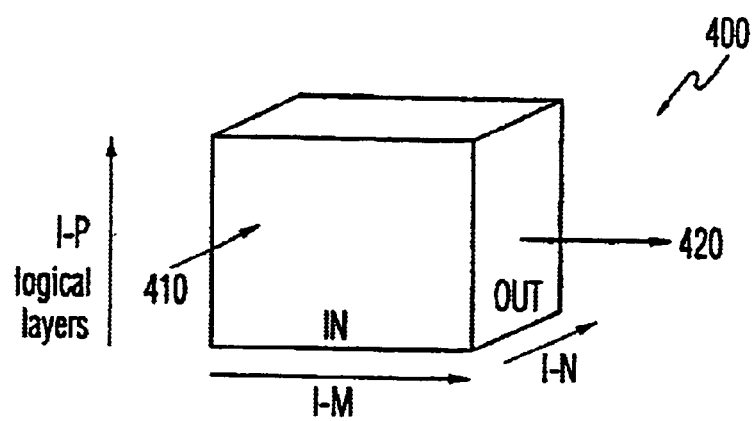
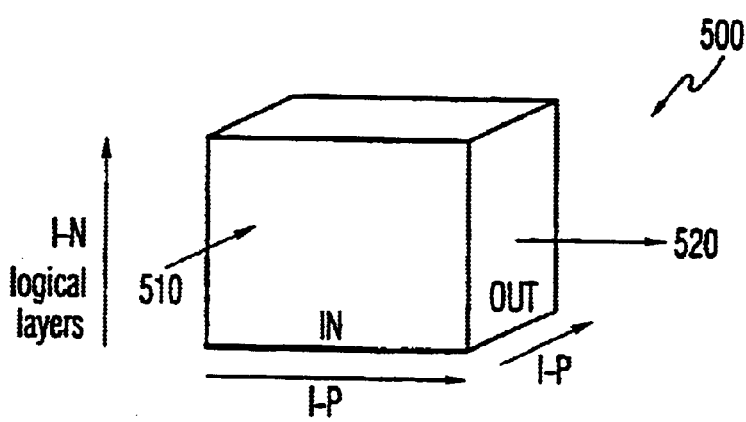
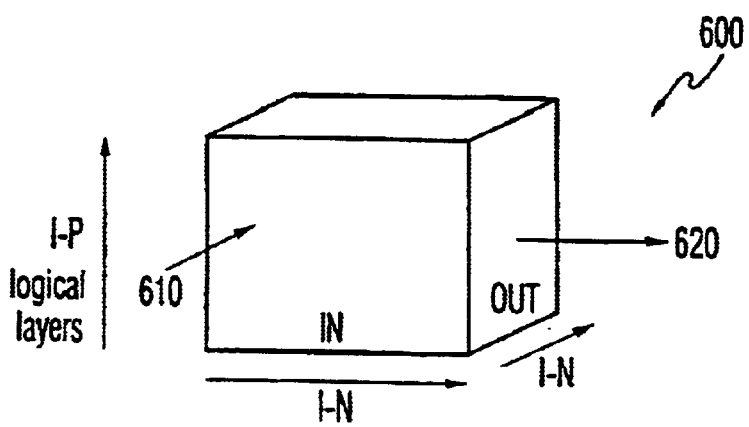
FIG. 22

SWITCHING DEVICE AND METHOD OF FABRICATING THE SAME

CROSS-REFERENCE TO RELATED APPLICATIONS

This application is a continuation-in-part of International Patent Application No. PCT/US00/03354 filed Feb. 10, 2000 designating the United States, the contents of which are incorporated herein by reference. The present application further claims the benefit of priority from: U.S. Provisional Application No. 60/170,482 filed Dec. 13, 1999, the contents of which are incorporated herein by reference; and U.S. Provisional Application No. 60/170,494 filed Dec. 13, 1999, the contents of which are incorporated herein by reference.

FIELD OF INVENTION

The present invention relates to the fields of wave and optical communication switching and, more particularly, to switching devices using arrays of switches, and in particular microelectromechanical switches.

BACKGROUND OF INVENTION

In fiber-optic communication systems, information is transmitted as a light or laser beam along a glass or plastic wire, known as a fiber. A significant amount of electronic communication and information transfer is effected through fiber-optic lines due to their much broader bandwidth and lower susceptibility to electromagnetic interference compared to conventional copper or metal wires. For example, much of the Internet and many long distance telephone communication networks are connected with fiber-optic lines. However, fast and efficient switching between optical fibers in a fiber-optic network has been difficult to achieve. Switches are needed to route signals at the backbone and gateway levels of these networks where one network connects with another, as well as at the sub-network level where data is being transported from its origin or to its destination. In particular, in a wavelength division multiplexed (WDM) optical fiber network, many channels, each occupying a distinct wavelength of light, are multiplexed within the same fiber. In a WDM network, optical multiplexers and demultiplexers are need to combine component wavelength signals into the main optical fiber path and/or separate the optical channels from the main fiber path.

Various prior art switching technologies have been employed in fiber-optic systems. For example, in electrical cross-connect (or electro-optical) switch technology, the optical signal is transformed into an electrical signal, a switching operation is performed with an electronic switch, and the electrical signal is then transformed back into the optical domain. Another prior art solution is to use an optical switch or cross-connect (OXC) capable of connecting and disconnecting optical fibers in the optical domain. Integrated optical OXC devices have been used for this purpose. These devices are constructed of a material, such as lithium niobate, generally in a planar waveguide configuration that allows switching action to take place between various input and output ports. More recently, optical switches based on emerging microelectromechanical system (or MEMS) technology have received considerable attention. MEMS, including micromechanical or micromachined systems, boast considerable promise for overcoming many of the limitations associated with alternative prior art fiber-optic switching technologies, especially those limitations relating to cost, efficiency, size, wavelength dependence, cross-talk, and signal attenuation. As used herein, the term microelectromechanical (MEMS) device is intended to embrace devices that are physically small and have at least one component produced using micromachining or other microfabrication techniques, and the term MEMS device includes microactuators, micromechanical devices, and micromachine devices.

Optical MEMS systems, also referred to as microoptoelectromechanical systems (MOEMS), use microoptical elements that reflect, diffract, refract, collimate, absorb, attenuate, or otherwise alter or modulate the properties and/or path of a light beam or signal. These types of optical switches can be made very compact and small, typically within the micrometer to millimeter range. The insertion loss of a MOEMS switch interface is comparable to alternative technologies, and occurs mainly at the entry port of the switch where light leaves a first optical fiber and at the exit port of the switch where light re-enters a second optical fiber. These losses are due to the enlargement of the beam dimensions in free space, and generally the greater the distance travelled by a light beam in free space, the greater the insertion loss of the switch will be (lenses may be used to help decrease this effect). The medium of a MOEMS switch is typically air, but a vacuum, inert gas, or other suitable fluid may also be used. The transmission of light within the switch medium, if kept relatively small, amounts for only a small portion of the overall attenuation. Additionally, the non-blocking medium of the switch ensures that no interference occurs when different light paths cross, enabling light beams to traverse without mutual effect, attenuation, or cross-talk: see generally, Hecht J., "Optical switching promises cure for telecommunications logjam", *Laser Focus World*, page 69, (September 1998), the contents of which are incorporated herein by virtue of this reference.

For example, micromachined optical switches often use small mirrors that move to perform a switching operation. By actuating the mirror or moving element between a first position in which a light beam is allowed to pass unaffected by the mirror and a second mirror position in which the moving element reflects or interferes with the light beam, the path of an input light beam can be redirected into different outputs or otherwise interfered with. The use of mirrors, in particular, is advantageous since they operate independently of wavelength when reflecting an optical beam. However, MEMS switches or valves may also use other types of moving elements such as attenuators, filters, lenses, collimators, modulators, and absorbers to perform a desired switching operation. In general, to achieve low attenuation losses in a micromachined optical switch, the mirror or other optical element should be very smooth and of optical grade. In addition, the principle and means used to actuate the moving element of a MEMS device should be fast, simple, and provide reproducible and accurate alignment of the moving element. Furthermore, the actuator must be able to move that element by a sufficient amount to accomplish the switching task. An improved MEMS device capable of advantageously acting as such an optical switch is disclosed in applicant's co-pending U.S. patent application Ser. No. 09/619,013, filed concurrently herewith and entitled "Microelectromechanical Device with Moving Element", the contents of which are incorporated herein by reference.

To increase the capacity of fiber-optic communication networks, there is a growing desire and need to expand the number of fibers used in the network and/or the number of wavelength channels in a WDM fiber system. It is desirable and often necessary in these networks to have the capability to switch a given one of a plurality of inputs to a specific output. Consequently, the expansion of fiber-optic network capacity requires the use of high capacity switches capable of handling an increasing numbers of input and output ports. Such switches should be fast, efficient (i.e. have low losses), and compact. In addition, it is also desirable that the switching configuration be "non-blocking" so that the switching of one input fiber to an output fiber does not interfere with the transmission of any other input fiber to any other output fiber.

Prior art optical cross-connects (also referred to as crossbar configurations) typically perform the desired switching between input and output ports in a single two-dimensional rectangular array. For example, Lin in U.S. Pat. No. 5,960,132 describes an array of optical micromachined switches each comprising a reflective panel. An M-input by N-output cross-connect of the type taught by Lin, requires $M \cdot N$ switching elements. Furthermore, for a uniformly spaced array of switching elements each separated by the distance d, the maximum possible free space switching distance between an input and output port is given as $(M+N) \times d$. As a result, as the number of inputs and/or outputs in these optical cross-connects increases, the number of switches required to maintain full (non-blocking) switching flexibility rises rapidly, as does the size or footprint of the switching array. The insertion loss and cross-talk for certain input-output combinations in these two-dimensional cross-connects may also become unacceptably high due to a lengthening of the free space propagation distance for a light beam within the array and due to discrepancies and inaccuracies in the positioning of the micromachined switches. Furthermore, the micromachined switches may experience a considerable amount of friction during operation. For these reasons, a suitably compact and efficient optical switching device capable of switching between a large number of input and output ports has not been, heretofore, attained.

In U.S. Pat. No. 5,878,177 Karasan et al. disclose a switch architecture in which a layered switch fabric includes at least two switching layers. The layered optical cross-connect switches signals from an incoming set of optical fibers to an outgoing set of optical fibers. The input ports of each layer are fully connected to the outputs ports of that layer, i.e. any input can be switched to any output on a specific physical layer. The switching layers are not interconnected to one another, and so inputs on one layer cannot be switched to outputs on another layer, i.e. such connections are blocked. At least one switching layer receives a plurality of signals (e.g. separate WDM channels) from a common input optical fiber. To provide a more fully connected switching architecture, Karasan et al. further disclose an optical cross-connect having a two stage layered switch fabric. The first switching stage has a plurality of non-interconnected switching layers coupled to the incoming fiber trunks, and the second switching stage has a plurality of non-interconnected switching layers coupled to the outgoing fiber trunks. One output port of each switching layer of the first stage is coupled to one input port of each switching layer of the second stage via an interconnecting fiber trunk. The inclusion of a second stage thereby partly reduces the blocking resulting from a single stage cross-connect. Karasan et al. indicate that various types of switching elements may be incorporated into the switching configurations, including conventional mechanical, electro-optic, and microelectromechanical (MEMS) switches.

While the cross-connect switching configurations of Karasan et al. serve to reduce the size and dimensions of optical switching devices for high capacity networks, neither the single stage or double stage architecture provides for full connectability between inputs and outputs. More importantly, although Karasan et al. very generally suggest that MEMS switches can be incorporated into the disclosed configurations which they disclose, Karasan et al. do not teach or suggest any method of implementing the switching configurations with conventional MEMS switches. Although a three-dimensional configuration of conventional MEMS switches could technically be envisaged by dividing up portions of a large capacity two-dimensional configuration of conventional switches and simply stacking those portions one on top of another, the design difficulties in doing so compactly and efficiently are extensive. More specifically, conventional MEMS optical switches generally have optical switching elements etched within a substrate surface, so that the switching element or mirror is either disposed vertically with respect to the substrate or tilts (e.g. "pops up") with respect to the substrate. The optical signal or input of the conventional MEMS switch travels parallel to the substrate surface, and the output of the switch is also directed parallel to the substrate surface. To perform a switching operation, the optical switching elements must be erected out of the substrate plane, and, as a result, small deviations in the position of the mirror from the desired angular position with respect to the substrate may significantly affect device operation accuracy. This problem is exasperated by any attempt to form large two-dimensional and particularly three-dimensional array structures with such conventional MEMS devices. Additional reliability concerns may also arise due to the high torsion and friction experienced by tilting switching elements. Thus, conventional MEMS optical switches inherently favor a two-dimensional configuration as switching only take places above the surface of a single two-dimensional physical switching layer, without the ability for signals to transit or switch between different layers. Furthermore, because of the erected configuration of the optical switching elements in conventional MEMS switches, it is difficult to place two-dimensional switching layers on top of each other and in addition these layers cannot be tightly spaced apart since sufficient separation must be provided for the switching operation on top of each layer to take place.

Consequently, there is a need for a compact, reliable, and low-loss MEMS based switching device that is suitable for high capacity networks having a large number of input and output ports. Preferably, the switches of the device should be relatively insensitive to switch positioning inaccuracies. It would also be desirable to provide an improved WDM multiplexer/demultiplexer for facilitating the use of such a switching device in a WDM fiber-optic network, as well as an improved switching configuration for providing broadcast or multi-cast capability.

SUMMARY OF THE INVENTION

In a principal aspect, the present invention provides a switching devices that receives a plurality of input signals and provides a plurality of output signals and has switches arranged in a two- or three-dimensional array configuration. At least two of the switches, which are preferably micro-electromechanical MEMS switches, reside on distinct physical substrate layers in the switching device, and at least one of the signals travels through a penetrable zone of one of the physical substrate layers.

In one embodiment, the invention relates to a switching device for receiving a plurality of M input signals and providing a plurality of N output signals. Each input signal is directed along a path into the device and each output signal is directed along a path out of the switching device.

The switching device has a plurality of switches arranged in a two-dimensional array, each of the switches being located at an intersection in which a projection of the path of one input signal meets a projection of the path of one output signal. At least two of the switches reside on distinct physical substrate layers in the switching device, and at least one of said signals travels through a penetrable zone of one of the physical substrate layers.

Similarly, in another embodiment the present invention provides a three-dimensional switching device having a plurality of P logical switching layers. Each of the logical layers receives a plurality of M input signals and provides a plurality of N output signals, each input signal being directed along a path into said layer and each output signal being directed along a path out of said layer. Each logical layer comprises a plurality of switches arranged in a two-dimensional array, each of the switches being located at an intersection in which a projection of the path of one input signal meets a projection of the path of one output signal. At least two of the switches in each logical layer reside on distinct physical substrate layers in the switching device. Also, at least one of the signals travels through a penetrable zone of one of the physical substrate layers.

Preferably, one switch is located at each intersection in which a projection of the path of one of the input signals meets a projection of the path of one of the output signals. Also preferably, each switch resides on one of the physical substrate layers near a penetrable zone of that physical substrate layer, so that in at least one operative position of the switch a signal input to or output by the switch passes through that penetrable zone. The signals may be optical signals and the switches may include mirrors. Most preferably, each switch is a microelectromechanical or MEMS switch and comprises a generally planar switching element disposed in parallel to the surface of the physical substrate layer on which the switch resides and an actuator operatively engageable with the switching element for moving the switching element between different positions in a plane parallel to the surface of the physical substrate layer. Other types of MEMS switches may also be used.

In another embodiment a switching configuration has a first three-dimensional switching device and a second three-dimensional switching device as above. The number of logical layers in the second switching device equals the number of output signals in each logical layer of the first switching device, and wherein one and only one output from each logical layer of the first switching device is received as an input to a logical layer of the second switching device. Preferably, the number of input and output signals in each logical layer of the second switching device equals the number of logical layers in the first switching device, and the logical layers of the second switching device are positioned orthogonally with respect to the logical layers of the first switching device so that the paths of the output signals from the first switching device are colinear with the paths of the input signals of the second switching device.

To, for example, provide a Clos switching configuration, the configuration may further include a third switching device with the number of logical layers in the third switching device equaling the number of output signals in each logical layer of the second switching device, and where one and only one output from each logical layer of the second switching device is received as an input to a logical layer of the third switching device. Preferably, the number of input and output signals in each logical layer of the second switching device equals the number of logical layers in the first switching device and the number of input and output signals in each logical layer of the third switching device equals the number of logical layers in the second switching device. Also preferably, the logical layers of the third switching device are positioned orthogonally with respect to the logical layers of the second switching device so that the paths of the output signals from the second switching device are colinear with the paths of the input signals of the third switching device.

In addition, a strictly non-blocking switching configuration may be provided, for example, with a first Clos switching configuration and a second switching configuration as above. For the first switching device in the first Clos switching configuration each logical layer includes a second path for each output signal out of the logical layer, and the second paths of the output signals are colinear with the paths of the input signals in that layer. For the third switching device in the second Clos switching configuration each logical layer includes a second path for each input signal into the logical layer, and the second paths of the input signals are colinear with the paths of the output signals in that layer. The first and second Clos switching configurations are positioned such that the second paths of the output signals from the first switching device of the first Clos switching configuration are colinear with the paths of the input signals of the first switching device of the second Clos switching configuration, and the paths of the output signals from the third switching device of the first Clos switching configuration are colinear with the second paths of the input signals of the third switching device of the second Clos switching configuration.

In another aspect, the present invention provides a method of fabricating the three-dimensional switching device above. The plurality of switches are fabricated on a main substrate surface, with the plurality of switches arranged in P rows, and the number of rows corresponding to the number of logical layers in the switching device. The plurality of switches on the main substrate surface are further divided into a plurality of sets of columns, with the columns in each set being uniformly spaced and each set of columns being separated from an adjacent column by a space equaling that of a single column. In this manner, each set of switches corresponds to the switches residing on one of the physical substrate layers. The method then further comprises separating the sets on the main substrate surface into the plurality of physical substrate layers, aligning the separated physical substrate layers to form the logical layers of the switching device, and bonding the physical substrate layers together.

In another aspect, the present invention provides an optical device having a first diffracting reflection grating having a plurality of diffraction elements on one side thereof, and a second diffracting reflection grating having a plurality of diffraction elements on one side thereof. The first and second diffracting reflection gratings are positioned in parallel with one another, separated by a distance w, so that the side of the first diffracting reflection grating having the diffraction elements opposes the side of the second diffracting reflection grating having the diffraction elements.

The optical device can be used as a wavelength division multiplexing (WDM) demultiplexer by directing a WDM signal at an initial input angle of incidence on to the diffraction elements of the first diffracting reflection grating so that the WDM signal is separated into a plurality of component wavelength signals. Each of the component wavelength signals is reflected, at different angles, by the first diffracting reflection grating onto the diffraction elements of the second diffracting reflection grating and thereafter further reflected by the second diffracting reflection grating so that the plurality of component wavelength signals are output by the optical device in parallel and uniformly spaced from one another.

Similarly, the optical device can be used as a wavelength division multiplexing (WDM) multiplexer by directing a plurality of parallel and uniformly spaced component wavelength signals at a common initial input angle of incidence on to the diffraction elements of the first diffracting reflection grating. Each component wavelength signal is reflected, at different angles, by the first diffracting reflection grating onto the diffraction elements of the second diffracting reflection grating and thereafter further reflected by the second diffracting reflection grating into a single WDM signal.

In yet another aspect of the present invention, a switching device suitable for multi-casting is provided. The switching device comprises a first set of inputs for receiving a plurality of inputs signals; a second set of inputs; a third set of inputs; a first set of outputs for providing a plurality of output signals; and a second set of outputs. A signal provided at one of the second set of outputs is directed to a splitter which divides the signal into a first split signal and a second split signal, the first split signal being directed to an input in the second set of inputs and the second split signal being directed to an input in the third set of inputs.

A signal received at one of the first set of inputs in the switching device may be multicasted by directing the multicast signal to one of the second set of outputs so that the multicast signal is received at one of the second set of inputs and at one of the third set of inputs. The multicast signal received at at least one of said one of the second set of inputs and said one of the third set of inputs is then directed to another of the second set of outputs so that the multicast signal is received at another of the second set of inputs and at another of the third set of inputs. These steps are repeated until the desired number of multicast signals are received at inputs of the second and third sets of inputs.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which:

FIGS. 8A–8D illustrate another embodiment of a 1×2 optical switch;

FIGS. 16A–16B shows an alternative two-dimensional switching configuration which uses substantially less switches and a has a smaller footprint size;

FIG. 21 shows a cross-connect configuration having three three-dimensional switching blocks to provide a Clos switching configuration;

FIG. 22 illustrates the number of inputs, outputs, and logical layers in a generalized Clos switching configuration of FIG. 21;

FIG. 24 shows a strictly non-blocking switching configuration having first and second Clos cross-connect configurations;

DETAILED DESCRIPTION OF PREFERRED EMBODIMENTS

The present invention provides a variety of two- and three-dimensional switching devices having different array configurations. The switching devices of the present invention may be used to switch different types of wave signals such as optical and acoustical. The switching device configurations of the present invention may further be used in optical computing applications, as optical logic devices or the like. However, without limiting the generality of the present invention, the remainder of the specification relates primarily to optical cross-connect embodiments of the present invention that are suitable for fiber-optic switching applications.

Figure 1:
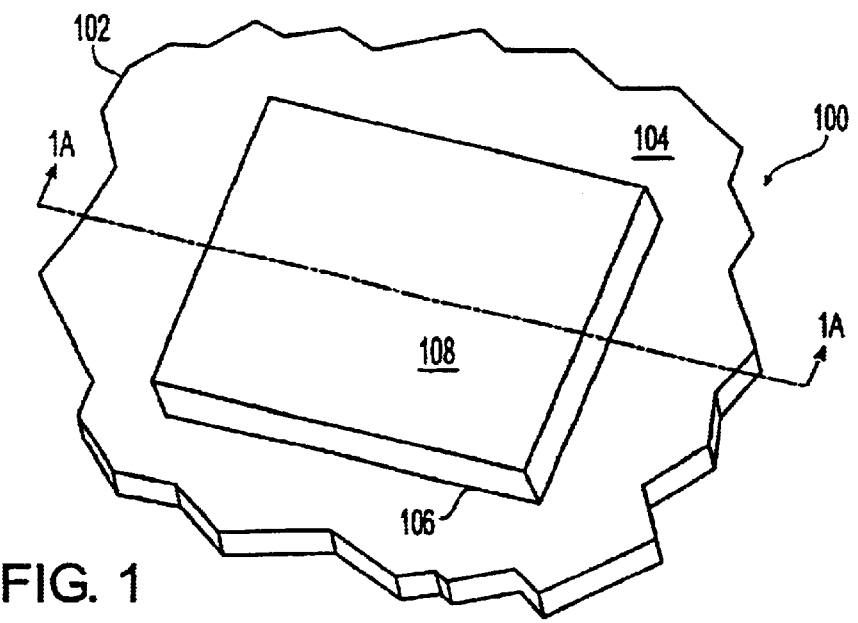
FIG. 1 is an isometric view of the general configuration of a MEMS switching device for use in accordance with the present invention.
Figure 1A:
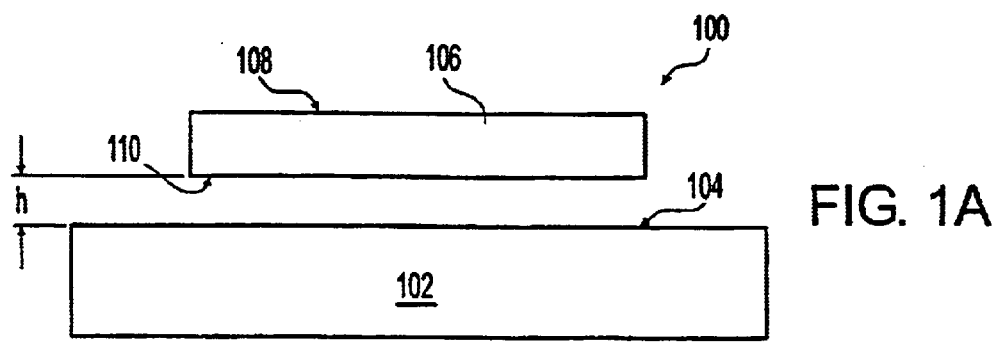
FIG. 1A is a cross-sectional view of the device taken along the line 1A—1A in FIG. 1.

The embodiments of the present invention preferably use microelectromechanical or MEMS switching elements, although the invention may also incorporate other types of wave switches such as liquid crystal switches. Furthermore, although different types of MEMS switching devices may be used, a switching device as disclosed in applicant's co-pending U.S. patent application Ser. No. 09/619,013 is most preferably used in the embodiments described below. FIG. 1 shows an isometric view of the general configuration of such a MEMS switch or valve device 100 in accordance with the present invention. The device 100 includes a substrate 102 having a surface 104. A moving or switching element 106 has a generally flat main portion is disposed in parallel to the substrate 102, above the surface 104. As described in detail below, moving element 106 may also have support wings, legs or other appendage-like members that are connected to the main portion of element 106 (not shown in FIG. 1). A cross-sectional view of the device 100 taken along the line 1A—1A in FIG. 1 is shown in FIG. 1A. Referring to FIGS. 1 and 1A, the main portion of moving element 106 has a first major surface 108 facing away from substrate 102 and a second major surface 110 that faces substrate 102, and more specifically surface 104 of substrate 102.

As shown, moving element 106, or more specifically the main portion thereof, is preferably separated from substrate 102 by a short distance h. As described in detail below, when device 100 performs a switching or actuation operation, element 106 is selectively moved to a different operative position in the horizontal plane located a distance h above substrate 102. While moving between operative positions in the horizontal plane, i.e. during actuation, moving element 106 may temporarily leave the horizontal plane. Furthermore, moving element 106 may be located on the surface 104 of substrate 102 above an aperture therein (i.e. h may equal zero), moving element 106 may be recessed within an aperture of substrate 102 (i.e. h may be slightly negative), or moving element 106 may be located on the other side of substrate 102 (i.e. h may have a relatively large negative value). In all embodiments, however, moving element 106 is disposed horizontally or in parallel to substrate 102.

As indicated, MEMS device 100 is particularly suitable for use as an optical switch or valve in a fiber optic communication network, although device 100 may be used as an acoustic wave switch with element 106 being an acoustic wave mirror or absorber. When used as an optical switch, moving element 106 is used to selectively reflect, diffract, refract, collimate, absorb, attenuate, or otherwise alter or modulate the properties and/or path of a light beam. Consequently, moving or switching element 106 may be an optical mirror, modulator, lens, collimator, attenuator, filter, or absorber for example. In particular, moving or switching element 106 is preferably a reflective mirror.

Figures 2, 3:
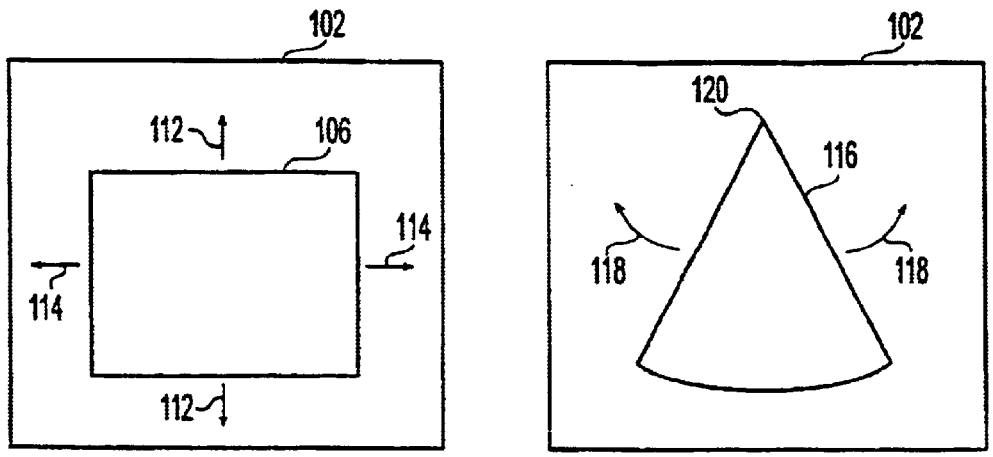
FIG. 2 shows the shape and motion of a moving element of the device in a preferred embodiment of the present invention.
FIG. 3 shows an alternative shape and motion of the moving element.

As shown in FIG. 2, moving element 106 may be rectangular and may move in a linear direction within a travel path, defining a range of travel, in the horizontal plane. For example, element 106 may have a travel path along the line defined by arrows 112 or the line defined by arrows 114. More generally, moving element 106 may move in any linear direction within the horizontal plane. In an alternate embodiment shown in FIG. 3, the moving element may be sector-shaped, as shown at 116, and may move in a radial or pendulum-like motion about a point 120, as shown by arrows 118. As a further alternative, the motion of element may 106 may be a combination of rotational and translational motion. As indicated, the main portion of moving element 106 is generally flat but otherwise may be of a shape other than those shown in FIGS. 2 and 3, such as circular or elliptical.

Figure 4:
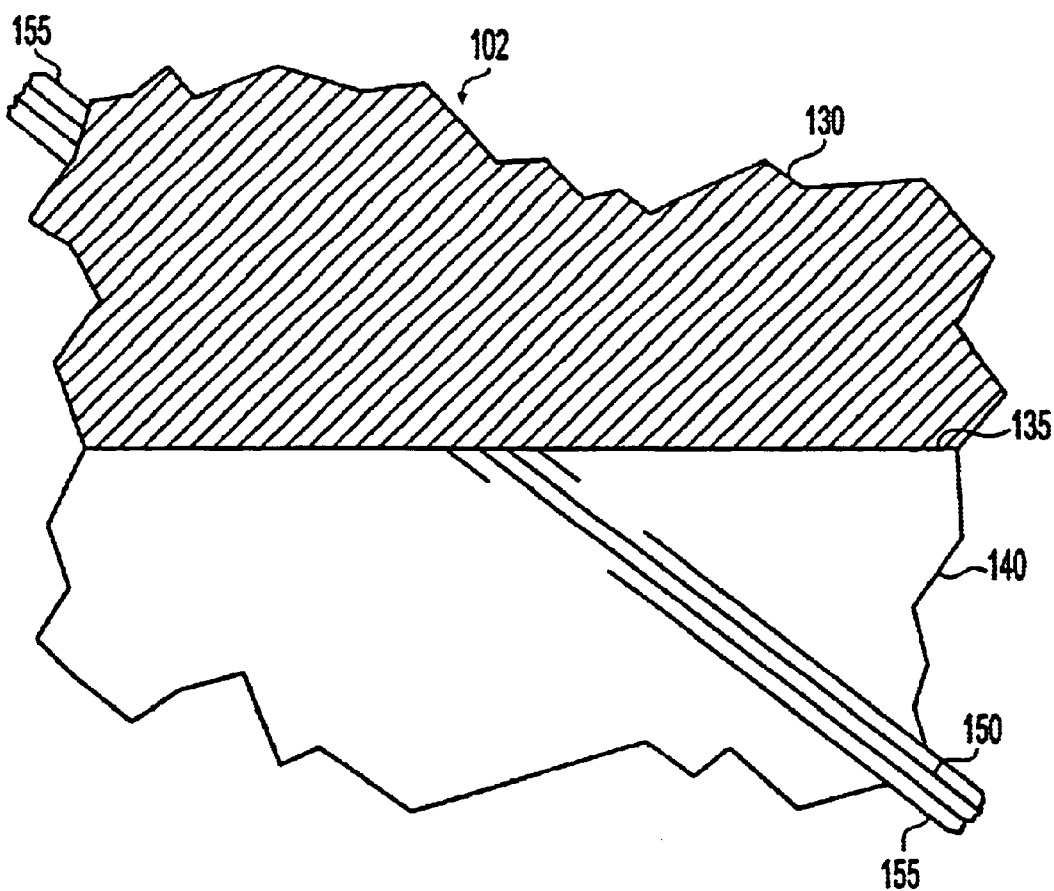
FIG. 4 shows the substrate zones of an optical switch MEMS device.

Substrate 102 is a semiconductor wafer substrate which may be fabricated using well known integrated circuit processing techniques. The substrate is preferably silicon based, but other materials such as glass, polymers, or metals may also be used. An actuator, which may comprise microelectronic components, is preferably built in or on substrate 102 and serves to actuate the desired movement of moving element 106. Substrate 102 is preferably produced with atom smooth surfaces and a high degree of parallelism and linearity. As shown in FIG. 4, in the case of an optical switch, substrate 102 may include a first zone 130 through which light 150 from an optical fiber 155 does not penetrate, and a second zone 140 which is transparent to light beam 150. A baseline 135 separates the zones 130 and 140. The switching or actuation of element 106 preferably occurs above (or below) the second zone 140, and in a direction parallel to or perpendicular to baseline 135. The second zone 140 may, for example, comprise a transparent glass. Alternatively, the substrate may simply be absent in zone 140, as long as sufficient structural support for device 100 is otherwise provided. For instance, zone 140 may be hole or aperture etched through substrate 102, and which is surrounded by zone 130 (e.g. see FIG. 8A). Generally, the zones 130 and 140 may be located on substrate 102 in any number of ways, and it is also possible for substrate 102 to have more than one zone 130 and/or zone 140 which are not contiguous. For example, two non-penetrable substrate zones 130 may be separated by a single penetrable zone 140.

Figure 5:
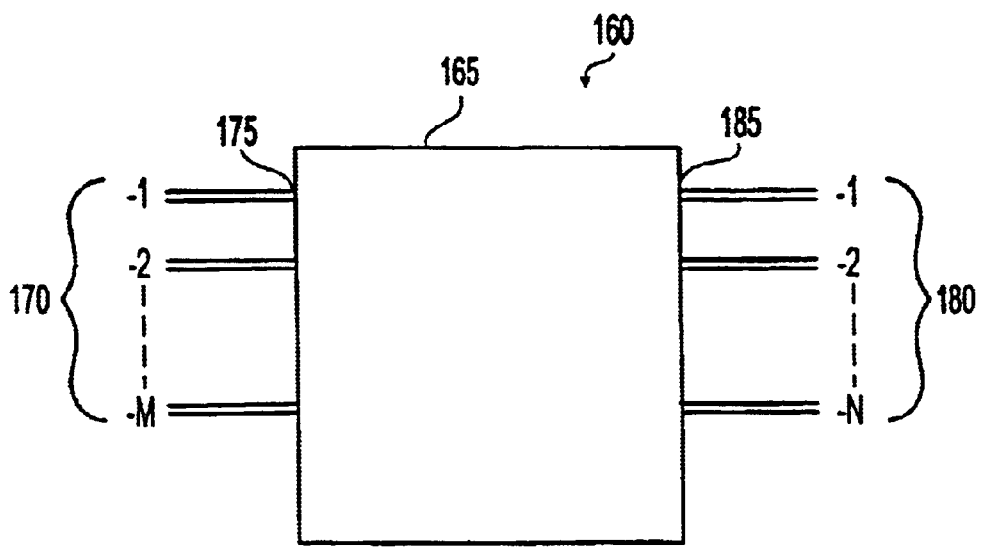
FIG. 5 shows a MEMS optical cross-connect switch.

As shown in FIG. 5, when device 100 is implemented within a MEMS optical cross-connect switch 160, it may have a support structure 165 which receives M input optical fibers 170 at corresponding input ports 175 on structure 165, and outputs N optical fibers 180 at corresponding output ports 185 on structure 165. Fibers 170 and 180 may, for example, be standard 125 $\mu$m fibers, and each of N and M may be greater than or equal to 1. Support structure 165 is preferably integrated with substrate 102, and is at least connected thereto. Where the medium of switch 160 is a vacuum or contains an inert gas, support structure 165 is a closed structure. To minimize dispersion of the light outside the confinement of the optical fibers, fibers 170 and 180 are carefully aligned and also placed as close as possible to the moving element of the switch without affecting or impeding the movement of that element.

Figure 6A:
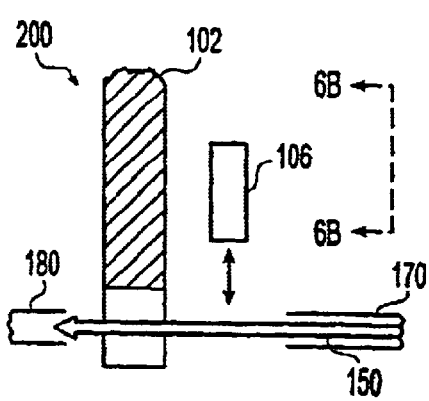
FIGS. 6A–6D illustrate the operation of the device as a 1×1 (ON/OFF) optical switch.
Figure 6B:
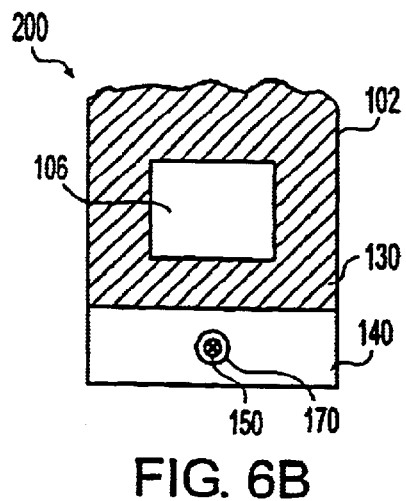
Figure 6C:
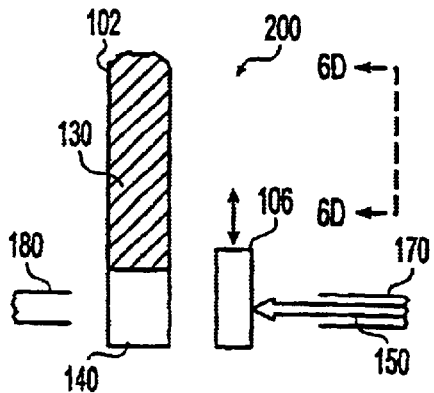
Figure 6D:
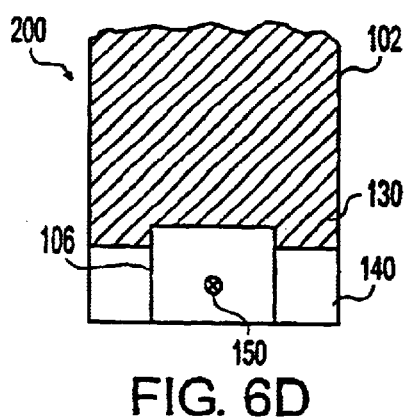

FIGS. 6A–6D illustrate the operation of device 100 as a 1×1 (ON/OFF) optical switch 200. FIGS. 6A and 6B show the switch 200 in a first or ON position in which light beam 150 exits input fiber 170, travels through zone 140 of substrate 102, and re-enters output fiber 180, unaffected by the moving element 106 of switch 200. FIG. 6B is a top view of switch 200 along the direction of arrows 6B—6B in FIG. 6A. As described above, light 150 passes through the penetrable zone 140 of substrate 102 before entering output fiber 180 as shown in FIGS. 6A and 6B. FIGS. 6C and 6D show the switch 200 in a second or OFF position in which moving element 106 has moved, parallel to substrate 102, into the path of light 150 so that light 150 is now incident thereupon. FIG. 6D is a top view of switch 200 along the direction of arrows 6D—6D in FIG. 6C. Since switch 200 is functioning simply as an on/off switch and since the light 150 is directly or normally incident on moving element 106 (i.e. has an angle of incidence of 0° in the OFF position), in this embodiment moving element 106 is preferably an optical absorber that takes up and dissipates the light 150 when in the OFF position (as opposed to a mirror that would reflect light 150 back into input fiber 170 when in that position).

Figure 7A:
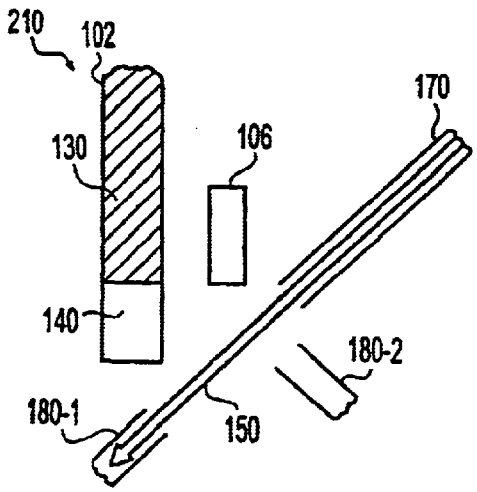
FIGS. 7A and 7B illustrate the operation of the device as a 1×2 SPDT optical switch
Figure 7B:
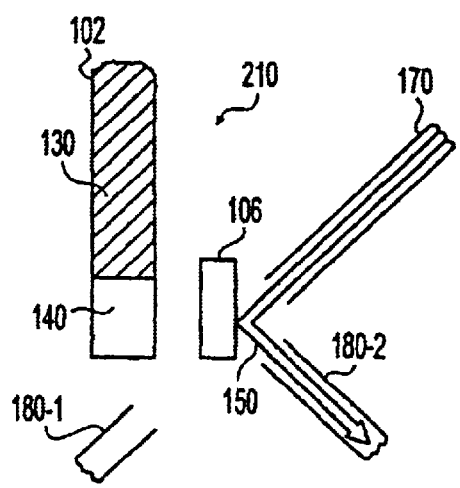

FIGS. 7A and 7B illustrate the operation of a MEMS switching device 100 as a 1×2 (single-pole double-throw or SPDT) optical switch 210 in which moving element 106 is preferably a mirror. In FIG. 7A, moving element 106 is in a first position and light 150 from input fiber 170 travels into a first output fiber 180-1. When moving element 106 is translated, parallel to substrate 102, to a second position shown in FIG. 7B, light 150 from input fiber 170 reflects off of the surface of mirror 106 and is directed into a second output fiber 180-2. In the second position of mirror 106 shown in FIG. 7B, light 150 is not normally incident upon the surface of mirror 106 but rather has an angle of incidence (i.e. the angle between the normal to the mirror surface and the light) that is greater than zero. In a preferred embodiment, the angle of incidence of the light 150 is about 45°. As will be appreciated by those skilled in the art, when switch 210 is actuated from one position to the other, the integrity of the information contained in the light output to fiber 180-1 or 180-2 will only be reliable once the switching operation is complete, and all of the light from input fiber 170 travels into either output fiber 180-1 or output fiber 180-2. As a result, having a fast switching speed for switch 210 is clearly advantageous and desirable.

Switch 210 of FIGS. 7A and 7B may be converted into a 1×1 (ON/OFF) switch by, for example, replacing either the output fiber 180-1 or the output fiber 180-2 with an optical absorber. In addition, in FIGS. 6A–6D, light 150 may also optionally be directed at the horizontal plane in which element 106 moves at an angle of incidence that is greater than zero (e.g. 45°), as in FIGS. 7A and 7B.

FIGS. 8A–8D illustrate another embodiment of a 1×2 optical MEMS switch 220 in which non-penetrable zone 130 of substrate 102 surrounds a light penetrable (i.e. transparent) zone 140 of substrate 102. FIG. 8A shows a top view of the switch 220, FIG. 8B shows a cross-sectional view along the line 8B—8B in FIG. 8A, and FIG. 8C (and FIG. 8D) shows a cross-sectional view along the line 8C—8C in FIG. 8A. In this embodiment of the invention, the moving element 106 is a mirror, and the mirror's movement in the horizontal plane is entirely above the penetrable zone 140. Alternatively, when zone 140 is a free space hole or aperture in substrate 102, moving element 106 may be located within zone 140, e.g. moving element 106 may be flush with the surface 104 of substrate 102. Also, especially when zone 140 is an aperture in substrate 102, the actuator (not shown in FIGS. 8A–8D) for switch 220 is preferably located in or on zone 130 of substrate 102, and any support structure for switch 220 is connected to zone 130. As shown in FIG. 8C, with the moving element 106 in a first position, light 150 from input optical fiber 170 travels through zone 140 into first output fiber 180-1. On the other hand, with the moving element 106 in a second position, shown in FIG. 8D, light 150 from input fiber 170 is incident at an angle to the surface of mirror 106, reflects off that surface, and is redirected into second output fiber 180-2.

Figure 9A:
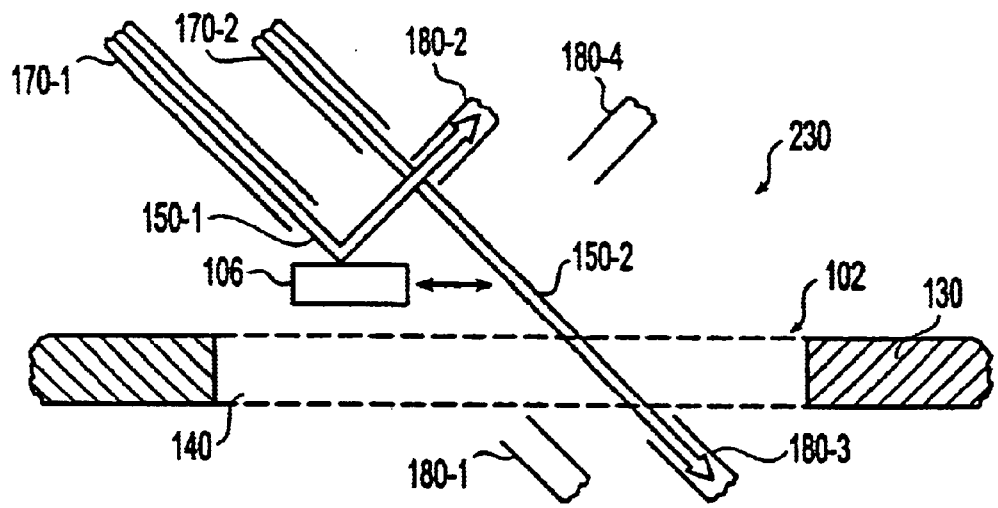
FIGS. 9A and 9B illustrate an adaption of the 1×2 switch of FIGS. 8A–8D to form a (1×2)×2 switch.
Figure 9B:
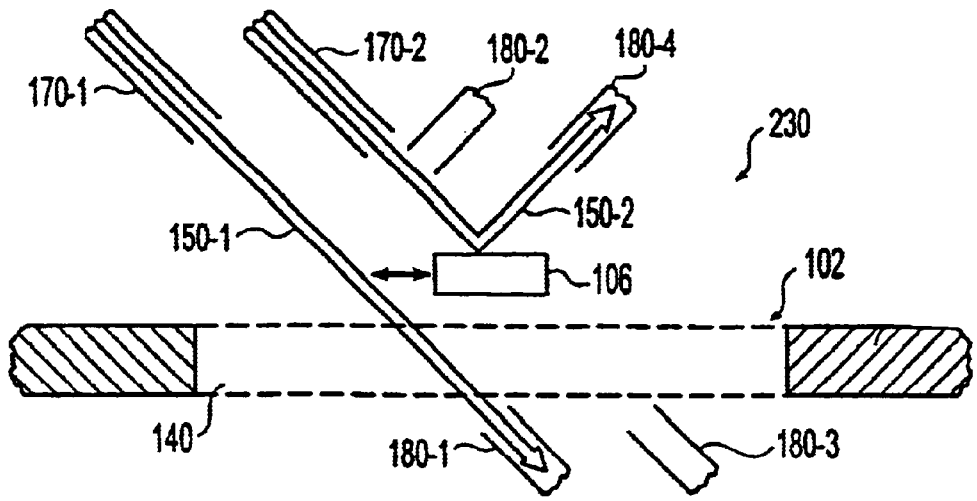

FIGS. 9A and 9B illustrate an adaption of the 1×2 switch 220 of FIGS. 8A–8D to form a (1×2)×2 switch 230. As shown, switch 230 includes two input optical fibers 170-1 and 170-2 carrying light beams 150-1 and 150-2 respectively. Light beams 150-1 and 150-2 preferably travel in parallel to one another as they exit their respective fibers 170-1 and 170-2. Switch 230 also includes four output optical fibers 180-1 to 180-4. Moving element 106 of switch 230 is again preferably a mirror. FIG. 9A shows moving element 106 in a first position in which light 150-1 from input fiber 170-1 reflects off of mirror 106 and is redirected into output fiber 180-2, and in which light 150-2 from input fiber 170-2 travels, unobstructed, through substrate zone 140 and into output fiber 180-3. When moving element 106 is in a second position, shown in FIG. 9B, light 150-2 from input fiber 170-2 reflects off of mirror 106 and is redirected into output fiber 180-4, and light 150-1 from input fiber 170-1 travels through substrate zone 140 and into output fiber 180-1. By, for example, replacing output fibers 180-2 and 180-4 with optical absorbers, switch 230 may be converted into a 1×1 (ON/OFF)×2 switch, in which one and only one of the light beams 150-1 and 150-2 is transmitted through switch 230.

Figure 10A:
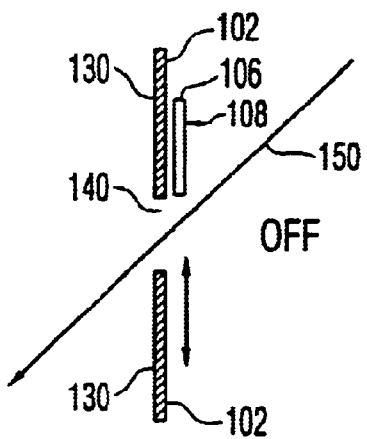
FIGS. 10A–10D show a further adaption of an ON/OFF or 1×2 switch by making both surfaces of a mirror element reflective.
Figure 10B:
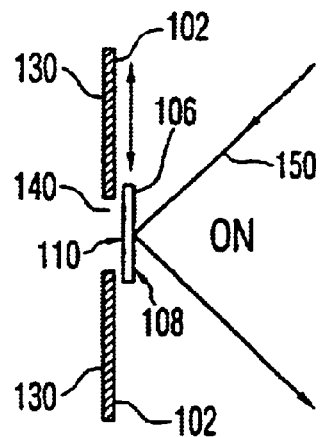

Furthermore, it should be noted that the light beams may travel through any of the switches described above in the reverse direction to that illustrated, that is with the input and output fibers reversed. For this purpose, where moving element 106 is a mirror, either one or both surfaces 108 and 110 of element 106 (see FIG. 1) may be reflective. In this manner, a further adaption of an ON/OFF or 1×2 switch shown in FIGS. 10A and 10B can be provided by making both surfaces 108 and 110 of a switching mirror 106 reflective, as shown for the device 240 in FIGS. 10C–10D. In this manner, the direction of two optical signals or light beams 150-1 and 150-2 can be simultaneously switched with the actuation of mirror 106.

Figure 11:
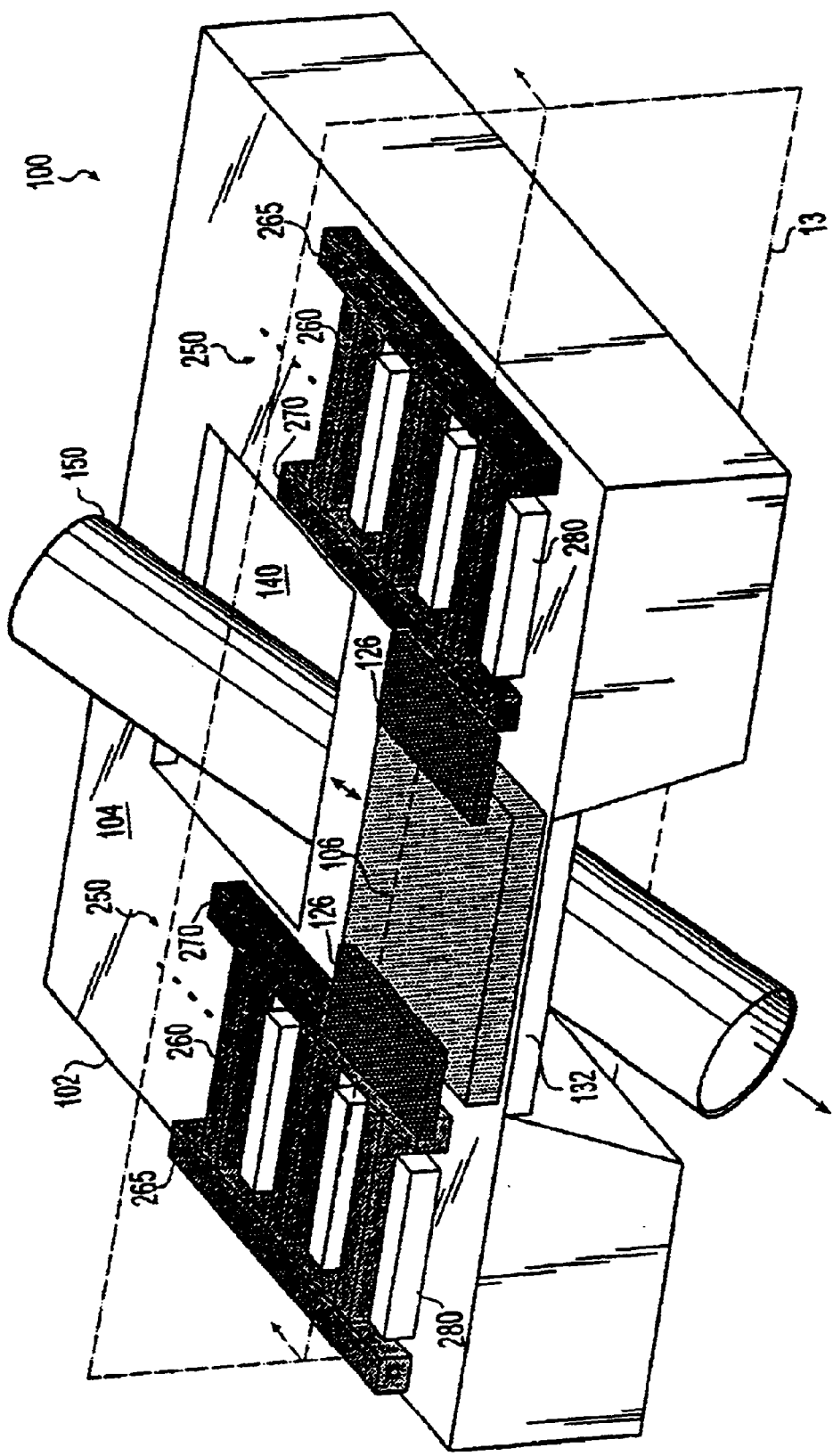
FIG. 11 is an isometric view of the MEMS switch with a preferred actuator.

As described above, to provide a switching function moving element 106 of MEMS device 100 operates between at least a first position and a second position. A number of preferred actuators for selectively changing the position of moving or switching element 106 in device 100 are disclosed in applicant's co-pending U.S. Pat. application Ser. No. 09/619,013, the contents of which (as indicated above) are incorporated herein by reference. These or other actuators may be used to actuate the mirrors or switching elements in the cross-connect switching configurations of the present invention. For example, FIG. 11 shows an isometric view of MEMS switch 100 in an OFF position with a preferred actuator 250 (for clarity, the entire actuator is not shown in FIG. 11 as indicated by the ellipses). The structure and operation of actuator 250 are described in detail in applicant's co-pending U.S. Pat. application Ser. No. 09/619,013. Briefly, actuator 250 comprises a number of actuating beams 260 extending generally parallel to surface 104 of substrate 102. There are two sets of actuating beams 260, one on each end of switching element 106. In each set, the actuating fingers have a base connected to an anchor portion 265 and a tip connected to a connecting beam 270. Element 106 includes wings 126 at each end, and wings 126 are supported by connecting beams 270 during actuation of element 106. When element 106 is not being moved or actuated it is supported by static posts or by legs (not shown) on substrate 102. The actuating beams 260 are electrostatically actuated, using side electrodes 280 and bottom electrodes (not shown), so that the tips of beams 260, and therefore connecting beams 270, move synchronously in a rotation-like motion to carry moving element 106 in a desired direction. As shown in FIG. 11, penetrable zone 140 of substrate 102 is a hole or aperture formed within the substrate through which the light beam 150 passes through when switch 100 is in an OFF position. It should be noted that the thin rectangular portion 132 of substrate 102 that lies underneath element 106 when it is in the OFF position is optional and may be removed.

As described in applicant's co-pending U.S. Pat. application Ser. No. 09/619,013, the fabrication of MEMS device 100 and its various components is preferably achieved using conventional micromachining techniques, including the well-known photolithography, deposition, and etching fabrication methods used in the microelectronics and micromachining industries. Batch manufacturing of MEMS devices in integrated circuit fabs or foundries permits the production large volumes of devices at extremely low cost. Surface micromachining techniques may be used to build up the structure in layers of thin films on the surface of a suitable wafer substrate. Typically, films of a structural material and a sacrificial material are deposited and dry etched in sequence. Due to its mechanical properties and compatibility with modern integrated circuit fabrication processes, polysilicon, i.e. polycrystalline silicon, is preferably used as the MEMS structural material.

MEMS device 100 advantageously provides for a fast actuation response, low losses, compact structure, and enables relatively large actuation displacements, unlike prior art devices that, for example, form the moving element by etching into the substrate wafer. The actuation of the moving element in MEMS device effectively occurs in parallel to the substrate as a translation, thus minimizing air resistance. Importantly, because of the high degree of planarity of substrate 102 and moving element 106 during fabrication, the design and positioning of the moving element in the present invention avoids small deviations that can significantly affect device operation accuracy, as may occur in prior art devices in which a moving element or mirror is disposed vertically with respect to the substrate or in prior art devices in which the moving element tilts with respect to the substrate. As indicated, MEMS device 100 may have a relatively long travel path, so that there is no overlap between operative positions of moving element 106 in terms of the location of these positions in the plane above substrate 102. Also, the use of the preferred actuators and preferred mechanisms for attaching moving element 106 as described in applicant's co-pending U.S. Pat. application Ser. No. 09/619,013, permit the device to be actuated or switched with minimal dynamical friction thereby reducing wear and increasing reliability. Use of the preferred actuators described above allows for fast response times. For all of the above reasons, MEMS switch 100 is the preferred switch for all of the embodiments of the switching device configurations of the present invention.

Figure 12:
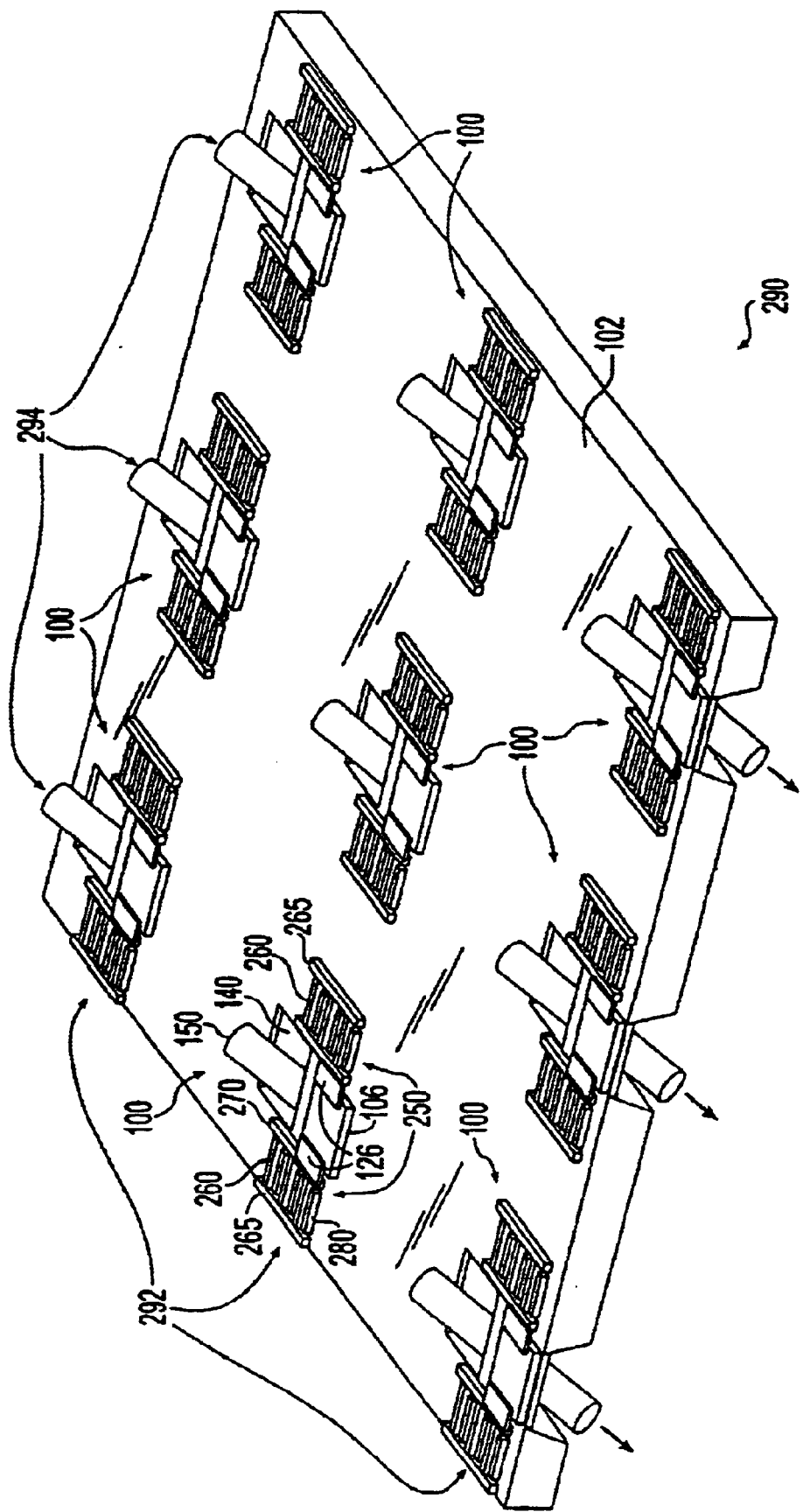
FIG. 12 shows a two-dimensional configuration of the switches of FIG. 11 on a common substrate.
Figure 13:
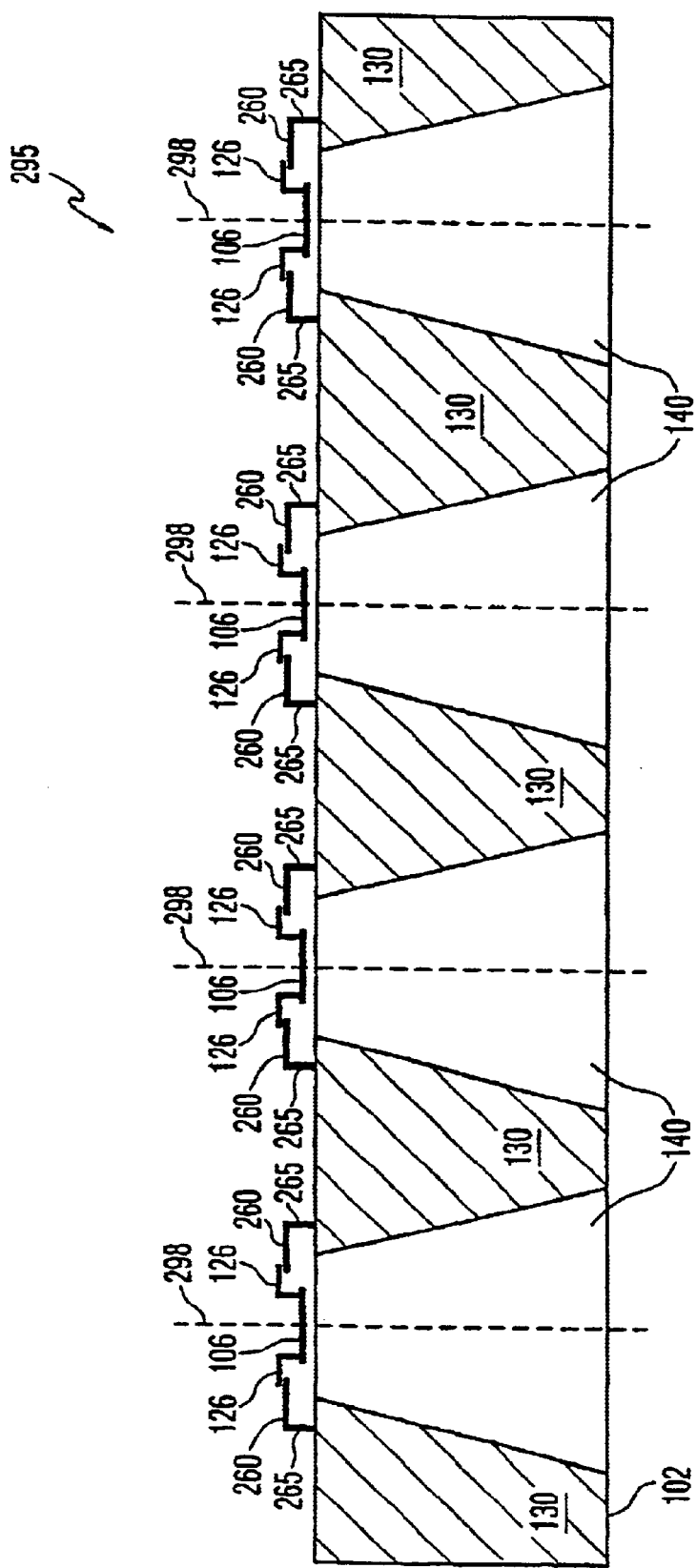
FIG. 13 shows a cross-sectional view of a one-dimensional configuration of the switches of FIG. 11 on a common substrate.

One and two dimensional configurations of switches 100 may be obtained by providing a number of switches 100 on and within a common substrate layer 102. FIG. 12 shows such a two-dimensional common substrate configuration 290 comprising switches 100 each including actuator 250, as shown in FIG. 11. The 3×3 array of switches 100 in configuration 290 are arranged in rows 292 and columns 294. Again, for clarity, each switch in FIG. 12 is shown in an OFF position in which an input light beam or optical signal passes through substrate 102 by way of a penetrable zone 140, but each switch 100 in configuration 290 is independently actuable. FIG. 13 shows a cross-sectional view of a one-dimensional common substrate configuration 295 of the switches of FIG. 11 (the view of each switch in FIG. 13 is generally taken along the cross-sectional plane 13—13 in FIG. 11). Switches 100 in configuration 290 are arranged in a 1×4 array, and the input and output signals of the switches travel in planes indicated by broken lines 298, as illustrated in FIG. 13. As also shown, substrate 102 preferably comprises a separate aperture or hole (i.e. region 140) in substrate 102 for each switch 100, and the apertures may have a tapered shape. As described below, structuring penetrable zones in this manner is highly advantageous when stacking several substrate layers to provide three-dimensional switching devices.

Figure 14A:
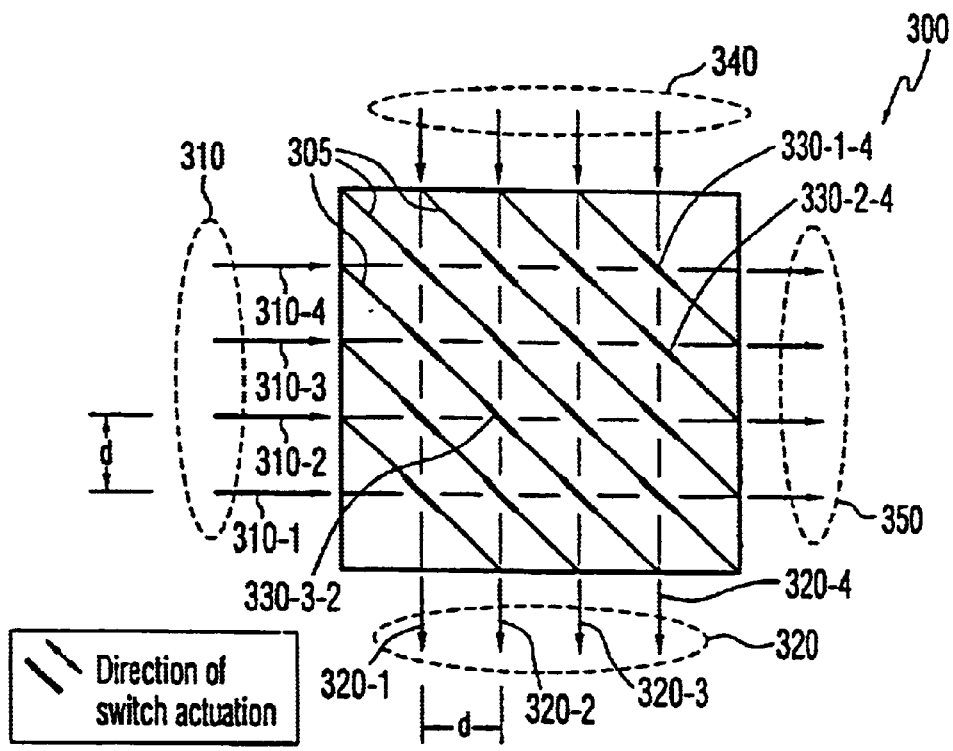
FIGS. 14A–14B show two dimensional M×N switching devices having a plurality of physical layers in accordance with the present invention.

In accordance with the present invention, by combining a plurality of one-dimensional common substrate switching configurations—such as the configuration 295 in FIG. 13—a two dimensional M×N array of switches may be implemented. FIG. 14A shows such an M×N switching device 300 in which each switch 330 is preferably a MEMS switch 100 having a switching element positioned generally parallel to the substrate surface. More generally, however, switch 330 may comprise any switch capable of selectively performing a switching operation on an optical signal that does not travel parallel to the substrate of the device, but rather is incident on the substrate plane at some angle—e.g. at an angle of incidence of 0° (as shown in FIGS. 6A–6D) or at an angle of incidence of about 45° (as shown in FIGS. 7A–7B)—so that in at least one of the operative positions of the switch, the optical signal travels through a penetrable zone of the switch substrate layer.

Figure 14B:
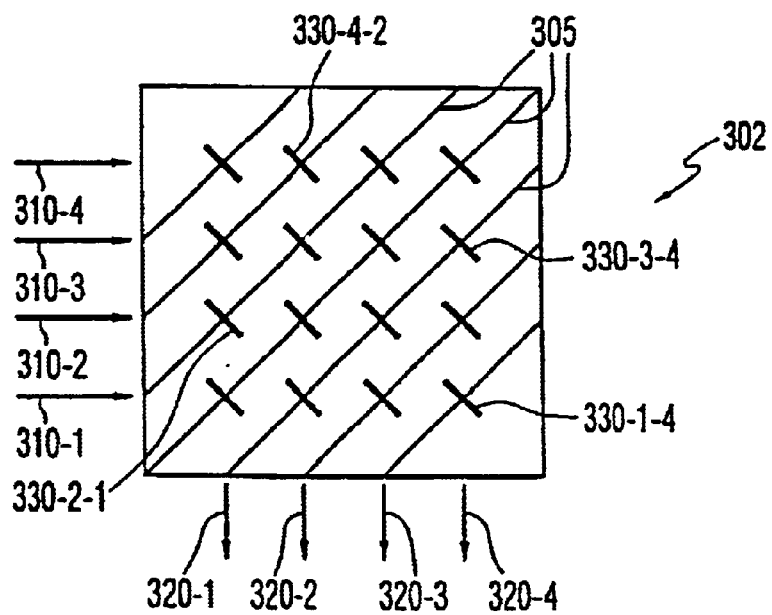
Figure 15A:
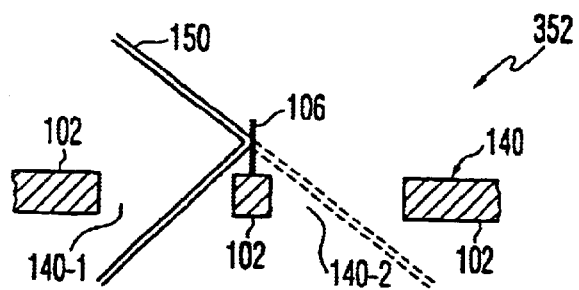
FIGS. 15A–15B show a possible MEMS switch for use in the switching device of FIG. 14B.
Figure 15B:
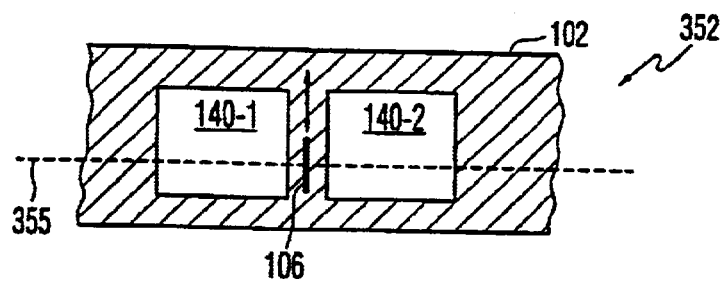

One exemplary alternate embodiment for an M×N switching device 302 is shown in FIG. 14B and has switches 330 each including a switching element that is vertically disposed with respect to substrate of the switch. Switches 330 may be actuated between OFF and ON positions in a number of different manners, for example they may be translated into or out of the page in FIG. 14B or they may undergo a "popping-up" motion when actuated. One possible MEMS switch 352 for use in switching device 302 is shown in FIG. 15A (side view) and FIG. 15B (top plan view). In MEMS switch 352, in each of its operative positions mirror switching element 106 is positioned vertically with respect to surface 104 of substrate 102. Substrate 102 includes two penetrable zones 140-1 and 140-2, as best seen in FIG. 15B. When mirror switching element 106 is in a first vertical position (not shown), light 150 which is preferably incident on surface 104 at an angle of approximately 45° passes through penetrable zone 140-2 of substrate 102, unaffected by element 106. When mirror switching element 106 is in a second vertical position shown in FIGS. 15A–15B, light 150 reflects off the surface of mirror element 106 and is thereby redirected through penetrable zone 140-1 of substrate 102 (light 150 travels along the plane indicated by broken line 355 in FIG. 15B). Switching element 106 of MEMS switch 352 may be actuated between its vertical positions by any suitable actuation mechanism (not shown in FIGS. 15A–15B).

In contrast to switching devices 300 and 302, in prior art two-dimensional M×N cross-connects having MEMS switches the optical signals travel parallel to the surface of a common substrate, i.e. all of the optical switching elements are positioned upon a single physical layer. According to the present invention, however, switching devices 300 and 302 include a plurality of physical substrate layers 305 that are generally arranged and aligned in parallel to one another, as shown in FIGS. 14A and 14B respectively. Preferably, a two-dimensional M×N switching device 300 or 302 includes (M+N−1) physical substrate layers The structure and operation of switching device 300 is now described (the structure and operation of switching device 302 very closely parallels that of switching device 300 and so is not also separately provided). Referring to FIG. 14A, each of switching devices 300 and 302 receives a plurality of inputs 310 and provides a plurality of outputs 320. Generally, switching device 300 can route any of M optical inputs 310 to any of N optical outputs 320 in the device, and as a result the array is described as being non-blocking, i.e. it effectively has a zero blocking probability as defined in U.S. Pat. No. 5,878,177 to Karasan et al, the contents of which are incorporated herein by reference. Each input signal is directed along a path into switching device 300 and each output signal is directed along a path out of switching device 300. In switching device 300 of FIG. 14A, M=N=4. With the index notation use herein, the plurality of inputs 310 are inputs 310-i where i is an integer and $1 \leq i \leq M$, and outputs 320 include outputs 320-j where j is an integer and $1 \leq j \leq N$. (It will be appreciated that in most applications of the present invention the number of inputs M will equal the number of outputs N, but that the present invention is not limited to such cases.) As shown the input and output signals are indexed and denoted in the followed manner: the path of the first denoted input signal 310-1 and the path of the first denoted output signal 320-1 are closest in proximity among the input signal paths 310-i and output signal paths 320-j; and the path of the M'th denoted input signal 310-M and the path of the N'th denoted output signal 320-N are the most distant among the input signal paths and output signal paths. The input signals 310-i between the first input signal 310-1 and the M'th input signal 310-M (signals 310-2 and 310-3 in FIG. 14A) are incrementally denoted, as shown. Similarly, output signals 320-j between the first output signal 320-1 and the N'th output signal 320-N are also incrementally denoted. Preferably, the input signals path are parallel to one another, and the output signal paths are also parallel to one another.

As shown in FIG. 14A, a switch 330-i-j is located at the intersection of each input 310-i with each output 320-j, i.e. at the intersection of the projected paths of those signals within the switching device. Switches 330-i-j thereby form a rectangular two-dimensional array. In this manner, the indices i and j may be thought of as row and column switch indices for the two-dimensional array of switches 300, although the arrangement may not be rectangular where the input signals have different angles of incidence. The two dimensional array of switches 330 may be considered a single logical layer of switching elements, although, as indicated, this does not correspond to a physical layer of the switching device (i.e. the term "logical layer" as used herein refers to a configuration of switches that act to switch between a set of inputs and outputs but that, physically, are not located on a common substrate). This important distinction is exploited in providing three-dimensional switching configurations in accordance with the present invention, as described below.

Each switch 330-i-j is actuable between a first (e.g. OFF) position and a second or (e.g. ON) position. Preferably, each switch 330-i-j includes a mirror or reflective surface as the switching element so that when switch 330-i-j is OFF the i'th input signal 330-i passes through the i-j intersection unaffected and when switch 330-i-j is ON the input signal 330-i is reflected off of the switching mirror into the path of output 320-j. In this manner, any input 310-i can be switched or re-directed to any desired output 320-j on a one-to-one basis. Switching device 300 is non-blocking as long as only a single switch is actuated (turned ON) for any input index i and only a single switch is actuated for any output index j.

If multicasting or broadcasting capability is desired, switches 330 could be adapted to include, for example, transmissible switching elements such as partially reflective mirrors. In this manner an input 310-i may be broadcasted by actuating all of the switches 330-i-j in the row of switching device 300 corresponding to that input, so that each of the actuated switches directs the input 310-i to an output. Alternatively, a switching configuration according to a further aspect of the present invention, described below, can be incorporated in switching device 300 to provide broadcast or multi-cast capability.

As described above, the use of mirror-based MEMS switches 330 in such arrays is preferable and advantageous since their operation is generally fast, efficient, and independent of wavelength in comparison to other prior art optical switches. However, as described above, other types of switches (preferably including micro-switching elements) may also be used in switching devices 300, 302, and the other switching devices provided by the present invention. The insertion loss of switches 330 is primarily due to the dispersion of light when travelling outside the confinement of the input and output optical fibers, i.e. as the optical signal travels within switching device 300 or 302. For small free space distances, this loss is comparable to that of alternative technologies, but the insertion loss increases as the free space propagation distance of the optical signal increases.

As shown in FIGS. 14A and 14B, the input signals 310 are preferably incident upon mirror-based switches 330 at a non-zero angle of incidence. In FIG. 14A, this angle of incidence is shown, for clarity of illustration, as being approximately 45°, however it should be emphasized that the angle of incidence of input signal paths on switch 330 may generally have any value. For instance, the paths of the input signals 310 and output signals 320 may be collinear or parallel; and such a configuration may be particularly desirable where switches 330 actuate a prism, collimator, or lens.

It will also be appreciated that the inputs and outputs in switching device 300 or 302 can be readily reversed to provide an N×M switching device by changing the direction of propagation of the optical signals. Furthermore, as shown in FIG. 14A, an additional set of inputs 340 (the paths of which are collinear with the paths of outputs 320) and/or an additional set of outputs 350 (the paths of which are collinear with the paths of inputs 310) may also be used for more complicated switching operations. For example, MEMS switches capable of simultaneously switching two different signals—such as MEMS device 240 having a double-sided mirror element in FIGS. 10C–10D—may be used where additional inputs 340 and additional outputs 350 are provided. As will be apparent, for an input signal 310 to be directed to a corresponding output 350, no switches 330 along the path of that input signal in FIG. 11 should be activated. Similarly, for an input signal 340 to be directed to a corresponding output 320, no switches 330 along the path of that output signal in FIG. 14 should be activated.

Each of the M×N switching devices 300 and 302 requires M·N switches 330. Furthermore, for a uniformly spaced array of switches 330 each separated by the distance d, the largest possible free space switching distance between an input and output port is given as (M+N)·d. For instance, for a rectangular 100×100 switching device 300 or 302 with a spacing d of 500 µm, 10,000 switching elements are required, the longest free space switching distance is 10 cm, and the switch has a size or footprint of 5 cm by 5 cm. Where M=N=Q, switching configuration 300 or 302 includes $Q^2$ and the largest optical path or distance is 2Q·d.

Figure 16A:
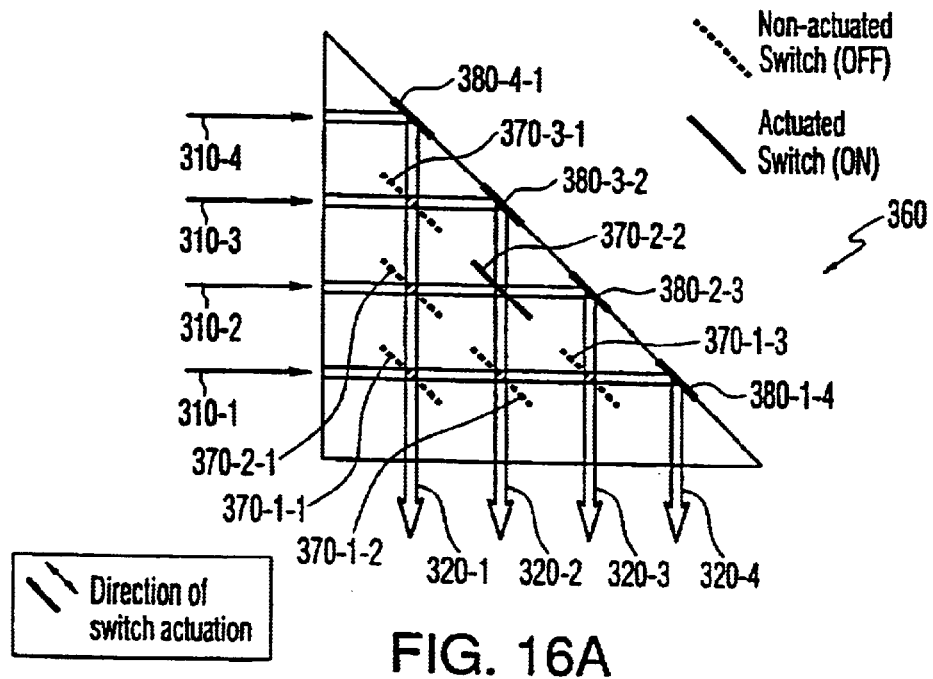

FIG. 16A shows another two-dimensional switching configuration 360 of switches which, in accordance with the present invention, provides the switching and non-blocking performance of the rectangular switching device 300, but with substantially less switches and a smaller footprint size. Switching device 360 generally has a triangular footprint and includes switches 370, actuable between a first position and a second position, that are capable of simultaneously switching two different signals. In switching device 360, a switch 370 is located at each intersection in which a projection of the path of the i'th input signal meets a projection of the path of the j'th output signal for which the value of i+j for that intersection is less than or equal to M or N, whichever is larger (i.e. max(M, N)). A further switch 380, which may comprise a static non-actuated switching element, is located at each intersection in which the path of the i'th input signal meets the path of the j'th output signal for which the value of i+j for that intersection equals max(M, N)+1. With M=N, an M×M switching device 360 is essentially a bisected version of an M×M device 300 with the preferably static switches 380 lying along a diagonal of the M×M array 300. FIG. 16A illustrates such an embodiment with M=N=4. In FIG. 16A, switch 370-1-1 defines a first physical switch layer, switches 370-1-2 and 370-2-1 defines a second physical switch layer, and switches 370-1-3, 370-2-2, and 370-3-1 defines a third physical switch layer. Static switches 380 define a fourth switching layer. Generally, switching device 360 includes (max(M,N)−1) physical layers of switches 370 and 1 physical layer of static switches 380. FIG. 16B illustrates an alternative embodiment of switching device 360 where M=3 and N=4, and with switches 370 arranged in similar physical layers as in FIG. 16A.

Figure 10C:
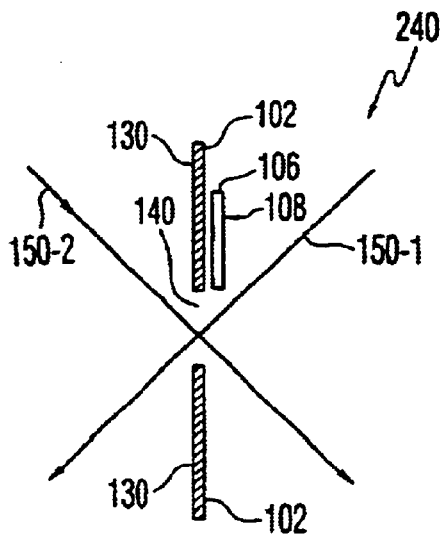
Figure 10D:
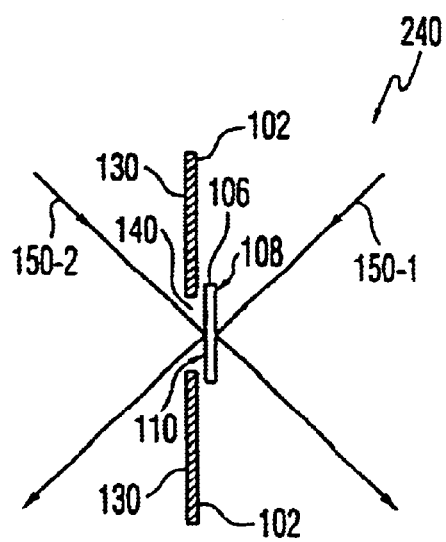

Preferably each switch 370 comprises MEMS device 240 having a double-sided mirror element and illustrated in FIGS. 10C–10D, and static switches 380 comprise a fixed mirror with a single reflective side. Switches 370, however may also comprise an adaption of MEMS switch 352 (FIGS. 15A–15B) where the switching element 106 is also a double-sided mirror element. Static switches 380 may simply comprise a reflective surface that extends to cover the position of all switches 380. Optionally, two switching devices 360 can be placed back-to-back, on opposite sides the physical layer defined by switches 380 and with static switches 380 also being reflective on both sides. The switching function of each of the switching devices 360 in such a configuration would preferably be uncorrelated. Alternatively, by replacing static switches 280 with actuable switches, a switching device with two sets of inputs and two sets of outputs, similar to that in FIG. 14A, may be provided.

In FIG. 16A, the paths of input signals 310 are again incident upon mirror-based switches 370 at an angle of approximately 45°, while in FIG. 16B the paths of input signals 310 are incident upon mirror-based switches 370 at an angle significantly greater than 45°. Again these incidence angles are exemplary, and the angle of incidence of the input signal paths on the switches 370 and static switches 380 may have different values, particularly if switches 370 include different types of switching elements.

With the switching configuration 360, less switches are required to achieve the same non-blocking switching flexibility provided by switching configuration 300 (or 302). In switching device 360, an input signal 310-i may encounter and be redirected by more than one switch 370 and/or 380 before travelling to a particular output path, but the distance or path length travelled by that input signal does not change in comparison to switching device 300. For example, in FIG. 13A: input 310-1 is reflected by static switch mirror 380-1-4 and is thereafter directed to output 320-4, input 310-2 reflects off a first reflective face of actuated (ON) switch 370-2-2 and is thereafter directed to output 320-2; input 310-3 reflects off a second reflective face of actuated (ON) switch 370-2-2 and is thereafter directed to output 320-3; and input 310-4 is reflected by static switch mirror 380-4-1 and is thereafter directed to output 320-1. By actuating various combinations of switches 370, any desired input-output switching correspondence can be achieved. For example, by also actuating switch 370-1-3 in FIG. 13A input 310-1 would be directed to output 320-3 and input 310-3 would be directed to output 320-4. By then further actuating switch 370-1-1, input 310-1 would be directed to output 320-1 and input 310-4 would be directed to output 320-3.

Generally, an M×N switching device 360 has

½·(M−1)·M−½·(M−N)·(M−N+1) if M≧N or ½·(N−1)·N−½·(N−M)·(N−M+1) if M<N switches 370 and the lesser of M and N (i.e. min(M,N)) static switches 380. For M=N=Q, device 360 has Q(Q−1)/2 switches 370 and Q switches 380. Thus, for instance with M=N=Q=100, switching device 360 comprises 4,950 switches 370 and 100 static switches 380 compared to 10,000 switches in a corresponding cross-connect 300. Alternatively, for M=50 and N=100, device 360 comprises 3,675 switches 370 and 50 static switches 380 compared to 5,000 switches in a corresponding switching device 300. This reduction in the number of switches and related decrease in the size or footprint of two dimensional switching device 360 in comparison to two-dimensional switching device 300 is advantageous.

As discussed above, when designed to handle a large number of inputs and/or outputs, the two-dimensional switching devices of FIGS. 14A–14B and 16A–16B have a relatively large and non-compact size or footprint. Furthermore, the insertion losses in these two-dimensional switching devices also become more problematic as this increase in size occurs since the optical signals must travel larger distances outside the confinement of fibers. In that connection, the present invention further provides smaller and more compact three-dimensional switching configurations having considerably shorter optical path lengths between inputs and outputs and therefore introducing significantly lower losses.

Figure 17:
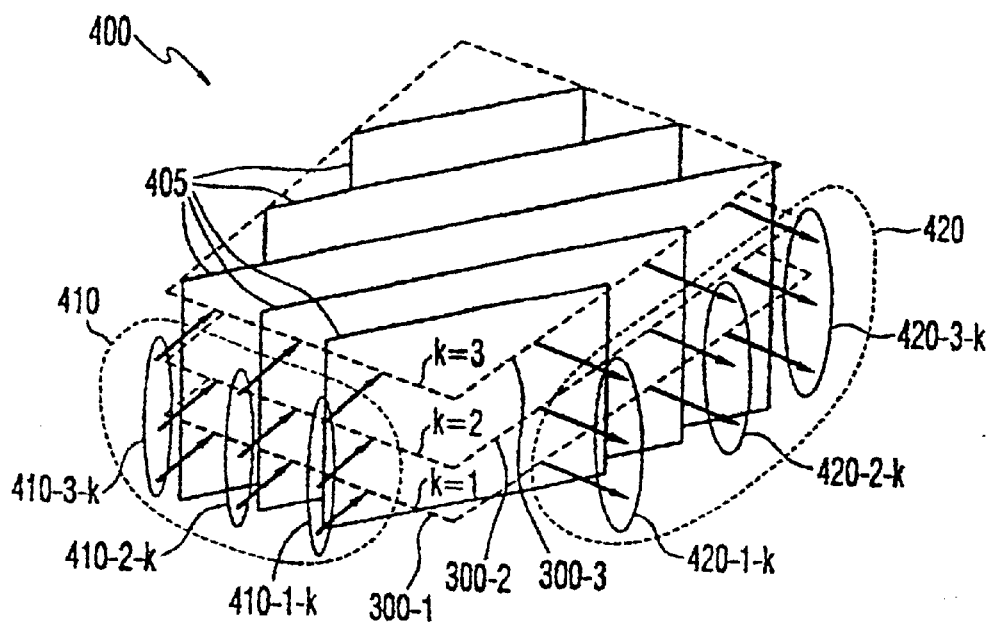
FIG. 17 illustrates the general configuration of a three-dimensional M×N×K switching device 400 according to the present invention.

FIG. 17 illustrates the general configuration of a three-dimensional switching device 400 according to the present invention. Switching device 400, which preferably has a rectangular or block configuration, receives a two-dimensional set of M×P inputs 410 and provides a two dimensional set of N×P outputs 420. As a result, switching device 400 has same switching capacity size as a two-dimensional switching device having M·P inputs and N·P outputs. In FIG. 17, M=N=P=3. In terms of its logical structure, switching device 400 effectively comprises a plurality, P, of stacked two-dimensional switching devices 300-k (such as those shown in FIGS. 14A–14B or 16A–16B) where k is an integer and 1≦k≦P. As described above, for a given value of k=K—i.e. for a given two-dimensional logical switching layer—any input 410-i-K can be switched to any output 410-j-K in a non-blocking manner. However, no switching is possible between the inputs and outputs of different two-dimensional logical switching layers in switching block 400, i.e. no switching is possible from an input 410-i-K1 and 420-j-K2 where K1 does not equal K2. Each two-dimensional array of switches may be considered a single logical layer of switching elements, but these do not correspond to the physical layers 405 in three-dimensional switching configuration 400. As in the two-dimensional switching devices of the present invention described above, switching device 400 includes a plurality of physical substrate layers 405 that are generally arranged and aligned in parallel to one another.

Generally, switching device 400 includes (M+N−1) physical substrate layers. Advantageously, this is the same number of physical layers as for a two-dimensional M×N switching device 300 or 302, since by simply extending the physical layers or substrates any number of additional logical layers may be provided. As a result, two dimensional switching configurations of the present invention are easily extended into three dimensions.

Figure 18:
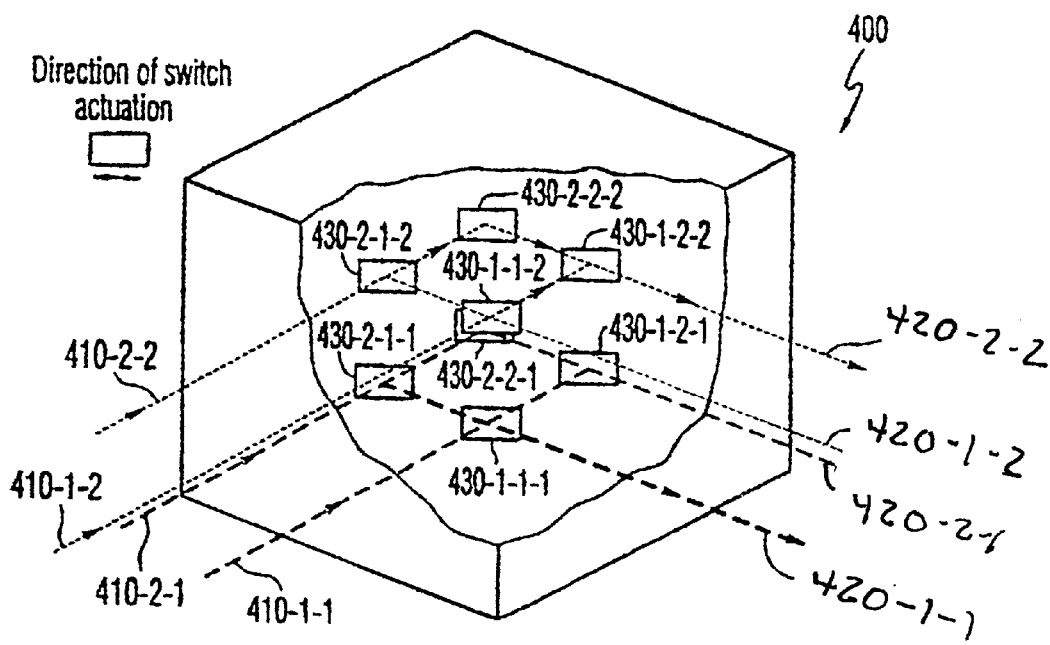
FIG. 18 illustrates the configuration of switches in a 2×2×2 block of the switching device of FIG. 17.

FIG. 18 illustrates the configuration of switches 430 in a 2×2×2 version of three-dimensional switching block 400 of the present invention. As shown in FIG. 18, a switch 430-i-j-k is located at the intersection of each input 410-i-k with each output 420-j-k, i.e. at the intersection of the projected paths of those signals within the switching device 400. In this manner, switches 430-i-j-k preferably form a rectangular three-dimensional block-like array, although the arrangement may not be rectangular where the input signals have different angles of incidence. The indices i and j may be thought of as row and column switch indices for each two-dimensional logical switching layer within device 400, with the index k designating a particular two-dimensional switching cross-connect. As shown in FIG. 18, switching device 400 includes M·N·P switches 430, although this number may be reduced by employing the switching configuration 360 (FIGS. 16A–16B) as two dimensional logical switching arrays 300-k in cross-connect 400.

Each switch 430 is preferably a MEMS switch 100 having a switching element positioned and actuated generally in parallel to the substrate surface. It is also preferred that the switching element of each switch 430 be a mirror or other reflective element. Generally, however, switch 430 may comprise any switch capable of selectively performing a switching operation on an optical signal that does not travel parallel to the substrate of the device, but rather is incident on the substrate plane at some angle, e.g. at an angle of incidence of 0° or 45°, so that in at least one of the operative positions of the switch, the optical signal travels through a penetrable zone of the switch substrate layer. Thus, for example, switch 430 may also comprise MEMS device 352 described above in connection with FIGS. 15A–15B, preferably having a mirror as the switching element thereof Although the angle of incidence of input signal paths on switches 430 may have different values, where the switches include mirrors, the angle of incidence of each input signal is preferably 45°. The use of switches 100, 352, or other suitable switches leads to a novel structure and layering of three-dimensional switching device 400.

Switching device 400 may be employed in applications in which full switching capability between all inputs and outputs is not required. For example, switching block 400 may be used as a wavelength selective cross-connect in a WDM system in which M fibers each carry P signals of different wavelengths. After demultiplexing the signal in each fiber (an improved demultiplexer that can be used for this purpose is described below), each two-dimensional logical switching array 300-k in switching device 400 receives all signals of a particular wavelength from each of the M fibers. Signals having the same wavelength are switched, as desired, in each logical cross-connect or layer 300-k, before output signals 420 are multiplexed again.

A Q×Q switching device block 400 may be provided (where Q is square) with M=N=P=and, having logical layers configured similar to two-dimensional array configurations 300, has $Q^{3/2}$ switches. For example, a 100 input by 100 output (i.e. Q=100) switching block 400 is provided with $M=N=P=Q^{1/2}=10$. With a switch spacing of 500 $\mu$m and using two-dimensional arrays 300 as the logical layers, such a switching device includes 1,000 switches 430, has a largest free space switching distance of 10 mm, and may have a cubic size of 1 cm by 1 cm by 1 cm. However, as noted, switching block 400 is partially blocked.

Figure 19B:
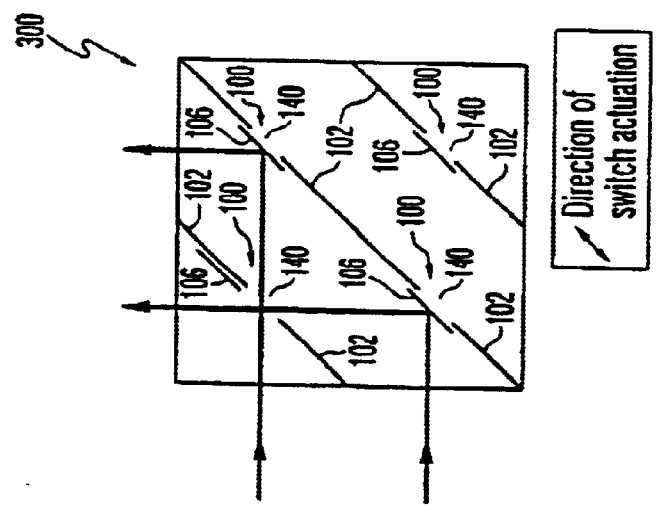
FIGS. 19A–19B show a switching configuration having two three-dimensional switching blocks.
Figure 19A:
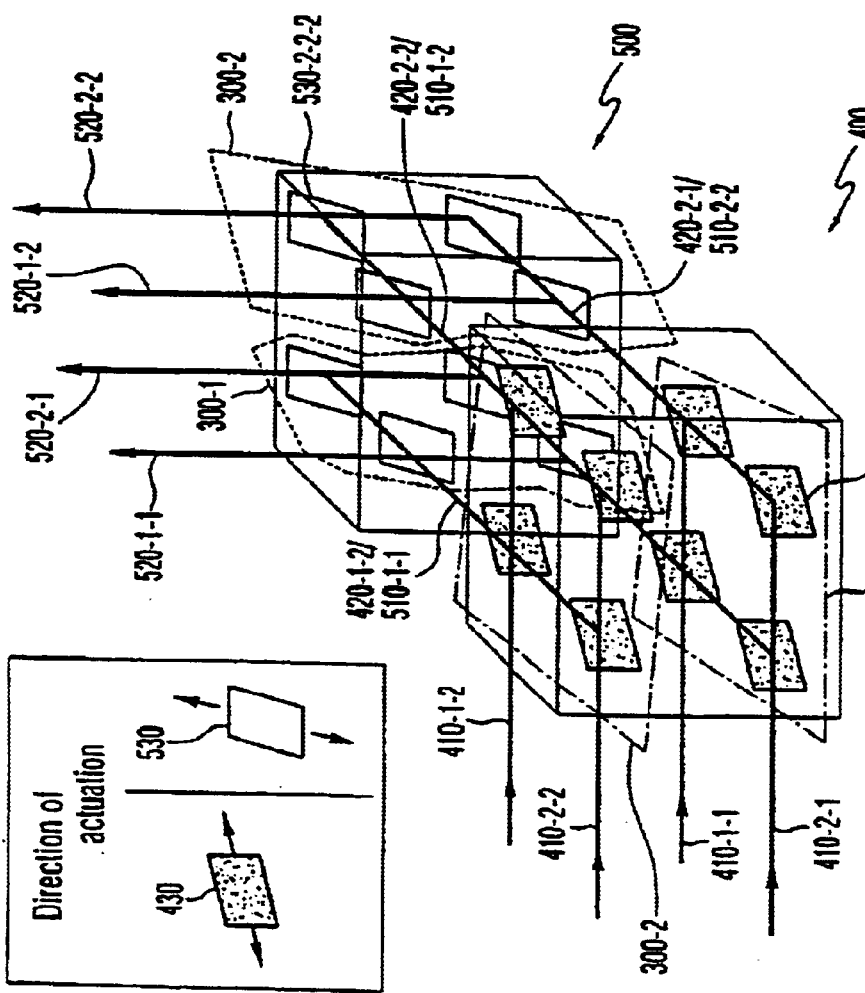

In many applications it is desirable to provide the ability to switch any input to any output, and in such applications the switching capability of block 400 is not adequate. FIG. 19A provides a more flexible switching configuration which includes block 400 and another similar switching device block 500. As described above, each logical switching layer in cross-connect 400 is a non-blocking two-dimensional switching array 300 which can be regarded as an i→j operator. As a result, in switching between an M×P array of inputs 410-i-k1 (k1 refers to an input "k" index where k1 is an integer and 1≦k1≦P) and a N×P array of outputs 420-j-k2 (k2 refers to an output "k" index where k2 is an integer and 1≦k2≦P), no switching between the indices k1 and k2 is possible using switching block 400 alone.

Figures 20A, 20B:
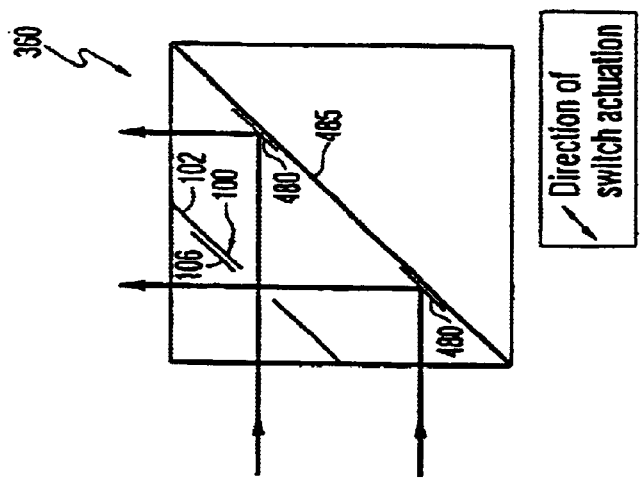
FIGS. 20A–20B show an alternative cross-connect configuration having two three-dimensional switching blocks.

Switching between the k1 and k2 indices above can be achieved by combining three-dimensional switching block 400 with another three-dimensional switching block 500 having switches 530, similar to block 400, as shown in FIGS. 19A and 20A. Generally, in these embodiments, block 400 receives an M×P array of inputs 410-i-k1 and provides an N×P array of outputs 420-j-k1. Switching block 400 includes P non-blocking two-dimensional logical switching arrays 300-k2 (or 360-k2). The N×P array of outputs 420-j-k1 is transposed to provide a P×N array of inputs 510-k1-j to block 500. Switching block 500 includes N non-blocking two-dimensional logical switching arrays 300-j (or 360-j). Each logical switching array 300-j in block 500 is able to non-blockingly switch between a set of P inputs and a set of P outputs. (Optionally, if some redundancy is desired each array 300-j could alternatively provide R outputs where R is greater than P, however in the remainder of the description it will be assumed that this is not the case). As a result, switching block 500 outputs a P×N array of outputs 520-k2-j. To form logical layer arrays 300-j, a MEMS switch 530-k1-k2-j is located at the intersection of each input 510-k1-j with each output 520-k2-j, i.e. at the intersection of the projected paths of those signals within the switching block 500. Again switches 530-k1-k2-j each preferably comprise a MEMS switch 100. As will be appreciated, in switching between the P×N array of inputs 510-k1-j and the P×N array of outputs 520-k2-j in block 500, no switching or changing of the index j is possible.

In this manner, from input 410-i-k1 to output 520-j-k2 three-dimensional switching block 400 acts as an i→j switching operator and three-dimensional switching block 500 acts as a k1→k2 switching operator. FIG. 19A shows a simple example of a switching device configuration comprising two three-dimensional blocks 400 and 500 where M=N=P=2. The physical layers of blocks 400 and 500 have been omitted from FIG. 19A for clarity of illustration. Switching block 400 includes two 2×2 logical layers (or two-dimensional arrays) 300-k1, and similarly switching block 500 includes two 2×2 logical layers 300-j, these logical layers, all of which are similar to the two-dimensional switching configuration 300 of FIG. 14A. As illustrated in FIG. 19B, each logical layer 300-k1 or 300-j of blocks 400 and 500 respectively preferably include four MEMS switches 100 having mirrors as switching elements 106. Referring to FIG. 19A, in the rectangular block configuration shown, the logical layers 300-k1 of block 400 are preferably positioned orthogonally with respect to the logical layers 300-j of block 500. This relative positioning conveniently achieves the necessary transposition between outputs 420-j-k1 of block 400 and inputs 510-k1-j of block 500, so that the optical signals may travel directly from switching block 400 to switching block 500.

Furthermore, at least where the switching configurations in blocks 400 and 500 are rectangular or "cubes" as illustrated in FIG. 19A, block 400 may be considered an operator that switches signals between a row index in the N×P array of input signals and leaves a column index for that array unchanged, whereas block 500 acts as an operator that switches the column index but leaves the row index unchanged. In addition, it should generally be noted that, in "transposing" the N×P array of outputs 420-j-k1 to provide the P×N array of inputs 510-k1-j to block 500, the order of the logical switching arrays 300 in block 500 is not crucial since, as indicated, each logical array 300 operates independently. This is illustrated by output signals 420-2-1 and 420-1-2 of block 400 becoming input signals 510-2-2 and 510-1-1, respectively, to block 500 in FIG. 19A. Consequently, block 500 could optionally be rotated by 180° so that the output signals 520-k2-j are directed downwardly in FIG. 19A.

FIG. 20A shows another embodiment of a switching configuration comprising two three-dimensional blocks 400 and 500 where M=N=P=2. In FIG. 20A, switching block 400 includes two 2×2 logical layers (or two-dimensional arrays) 360-k, and similarly switching block 500 includes two 2×2 logical layers 360-j, all of which are similar to the two-dimensional switching configuration 360 of FIG. 16A. FIG. 20B shows the switching array of each logical layer 360-k or 360-j of blocks 400 and 500, each including a MEMS switch 100 having a mirror as switching element 106 and two static mirror elements 480 on a substrate (physical layer) 485. In the embodiment of FIG. 20A, blocks 400 and 500 may be pyramidally shaped to reduce the size of the overall switch. As in FIG. 19A, the logical layers 360-k1 of block 400 are preferably positioned orthogonally with respect to the logical layers 360-j of block 500 so that the necessary transposition between outputs 420-j-k1 of block 400 and inputs 510-k1-j of block 500 is achieved. Again, for clarity, the physical layers of blocks 400 and 500 have been omitted from FIG. 20A.

The probability of blocking between certain input-output combinations in the switching configurations of FIGS. 19A and 20A is low, but still not zero: see generally U.S. Pat. No. 5,878,177 to Karasan et al, cited above. Although this non-blocking performance may be sufficient for some application, where full non-blocking capability is required, a third three-dimensional switching block 600 may be used in combination with blocks 400 and 500, as shown in FIG. 21. As described below, the combination of blocks 400, 500, and 600 forms a Clos switching configuration 700 with zero blocking probability.

In the switching configuration 700, block 400 receives an M×P array of inputs 410-i-k1 and provides an N×P array of outputs 420-q-k1 (where q is merely a dummy index, q being an integer and $1 \leq q \leq N$). Again, block 400 includes P non-blocking two-dimensional logical switching arrays 300-k1 (or alternatively 360-k1) each of which is able to non-blockingly switch between a set of M inputs and a set of N outputs. The N×P array of outputs 420-q-k1 is transposed to provide a P×N array of inputs 510-k1-q to block 500. Switching block 500 includes N non-blocking two-dimensional logical switching arrays 300-q (or alternatively 360-q) each of which is able to non-blockingly switch between a set of P inputs and a set of P outputs. To form two-dimensional logical switching arrays 300-q, a MEMS switch 530-k1-k2-q is located at the intersection of each input 510-k1-q with each output 520-k2-q, i.e. at the intersection of the projected paths of those signals within the switching block 500 (MEMS switches 530 are preferably MEMS switches 100). Switching block 500 outputs a P×N array of outputs 520-k2-q.

The P×N array of outputs 520-k2-q is transposed to provide an N×P array of inputs 610-q-k2 to block 600. Switching block 600 includes P non-blocking two-dimensional logical switching arrays 300-k2 (or alternatively 360-k2) each of which is able to non-blockingly switch between a set of N inputs and a set of N outputs. Switching block 600 outputs a N×P array of outputs 620-j-k2. Similar to blocks 400 and 500, to form each two-dimensional logical switching arrays 300-k2, switching block 600 includes MEMS switches 630-q-j-k2 located at the intersection of each input 610-q-k2 with each output 620-j-k2, i.e. at the intersection of the projected paths of those signals within switching block 600. As with all embodiments of the present invention, switches 630-q-j-k2 each preferably comprise a MEMS switch 100. It will also be appreciated that in "transposing" the P×N array of outputs 520-k2-q to provide the N×P array of inputs 610-q-k2 to block 600, the order of the logical switching arrays 300 in block 600 is not crucial since each logical array 300 operates independently. (Thus, block 600 could optionally be rotated by 180° so that the output signals 620-k2-j are directed to the left in FIG. 21).

Again, three-dimensional switching block 400 may be viewed as an i→q switching operator, three-dimensional switching block 500 may be viewed as a k1→k2 operator, and three-dimensional switching block 500 may be viewed as a q→j switching operator.

FIG. 21 shows the physical layers 405, 505, and 605 in each block 400, 500, and 600 respectively in Clos configuration 700 (the switches in blocks 400, 500, and 600 have been omitted for clarity). Clos switching configuration 700 transforms a 2×2 array of inputs 410 into a 2×2 array of outputs 620. The two independent logical switching layers 300 or 360 in each of blocks 400, 500, and 600 are delineated, in each block, by the broken lines in FIG. 21. As also shown in FIG. 21, the logical layers 300-k1 of block 400 are preferably positioned orthogonally with respect to the logical layers 300-q of block 500, and the logical layers 300-q of block 500 are preferably also positioned orthogonally with respect to the logical layers 300-k2 of block 600. Again, this relative positioning conveniently accomplishes the necessary transposition between outputs 420-q-k1 of block 400 and inputs 510-k1-q of block 500 and between outputs 520-k2-q and inputs 610-q-k2. As a result, the optical signals in switching configuration 700 may travel directly from switching block 400 to switching block 600 by ensuring that the paths of output signals from one block are colinear with the paths of inputs signals to the next block. As will be appreciated, careful alignment between blocks 400, 500 and 600 helps to minimize any losses.

Figure 23:
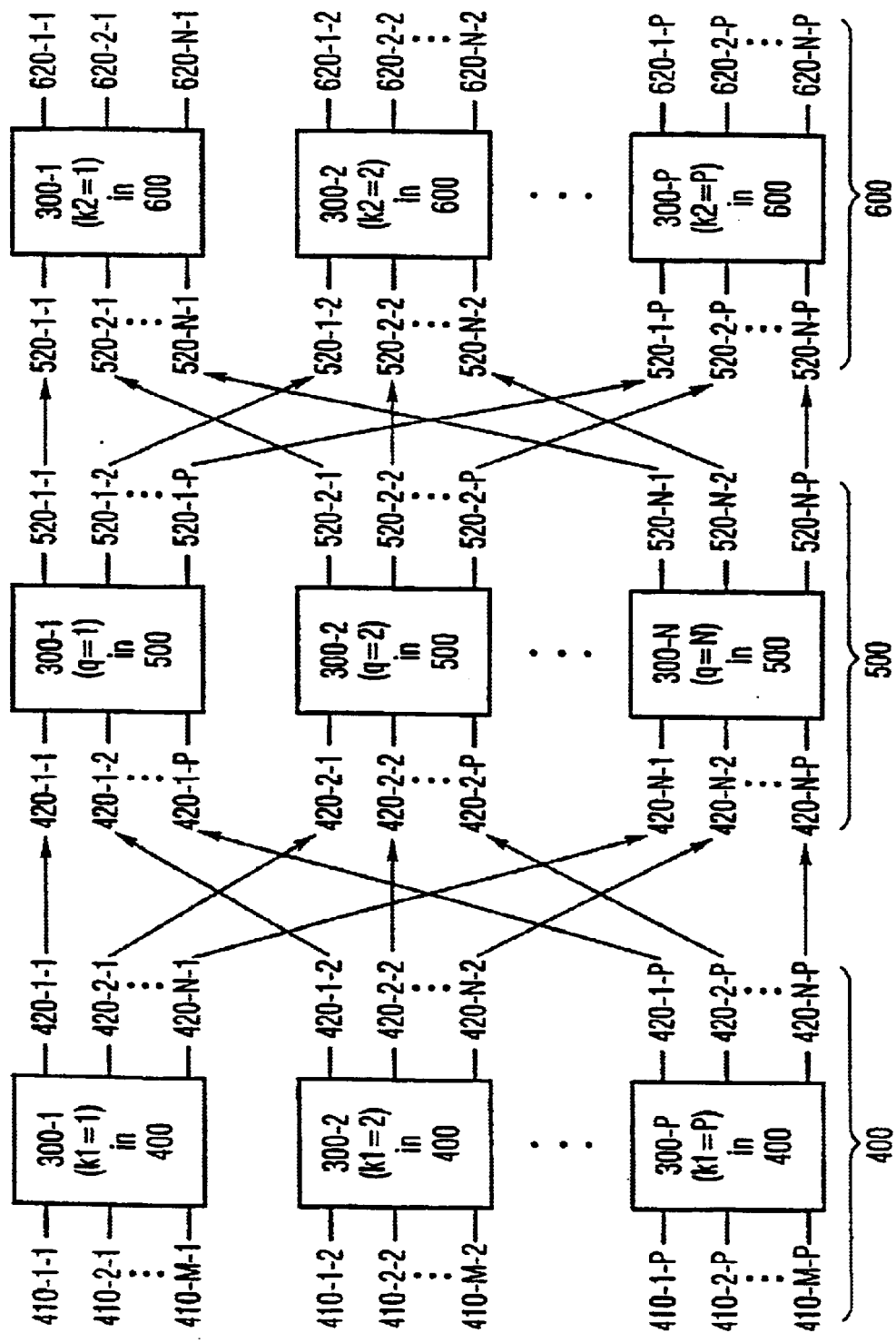
FIG. 23 illustrates the switching connections between two-dimensional switching arrays 300 in a generalized Clos cross-connect configuration.

In terms of the number of inputs, outputs, and logical layers for switching blocks 400, 500, and 600 in a generalized Clos switching configuration 700 are illustrated in FIG. 22. For further clarity, FIG. 23 also illustrates the switching connections between two-dimensional logical switching arrays 300 in a generalized Clos switching configuration 700. As will be apparent from the discussion above, the order of logical layers 300-q in block 500 may be varied, as may the order of logical layers 300-k2 in block 600.

All possible input-output switching combinations in Clos switching configuration 700 are operable, i.e. it is non-blocking and fully-connected, and multiple paths between inputs and outputs also exist to provide an additional advantage. Again, a fully-connected 100 input by 100 output (i.e. Q=100) switching configuration 700 may be provided with $M=N=P=Q^{1/2}=10$. With a switch spacing, d, of 500 $\mu$m and using two-dimensional switching configurations 300 as the logical layers, this switching configuration includes 3,000 switches (i.e. $Q^{3/2}$ or 1,000 switches in each of blocks 400, 500, and 600 for a total of $3Q^{3/2}$ switches), has a largest free space switching distance of about 2.5 cm (i.e. $5Q^{1/2} \cdot d$), and in terms of size may comprise three cubic blocks each of 5 mm (i.e. $Q^{1/2} \cdot d$) by 5 mm by 5 mm (i.e. $Q^{1/2} \cdot d$). These parameters of switching configuration 700 offer significant improvements over those obtainable from a 100×100 two-dimensional switching device, which requires 10,000 switching elements, has a longest free space switching distance of 10 cm, and has a footprint size of 5 cm by 5 cm.

Although switching configuration 700 of FIG. 21 is non-blocking, it may be necessary in configuration 700 to break the existing connection between an input and output and provide a rearranged connection between that input and output to accommodate a new switching connection between an unrelated input and output. This need to rearrange existing input-output connections to establish new input-output connections can be conveniently avoided by including another triplet set of three-dimensional switching blocks 400', 500', and 600'. This strictly non-blocking implementation is shown in FIG. 24.

Referring to FIG. 24, a strictly non-blocking switching configuration 800 includes a first Clos configuration 700 including three-dimensional switching blocks 400, 500, and 600 as explained above, and a second identically configured Clos configuration 700' including three-dimensional switching blocks 400', 500', and 600'. Switching block 400' is placed along side switching block 400, switching block 500' is placed along side switching block 500, and switching block 600' is placed along side switching block 600 as shown. In addition to outputs 420, switching block 400 includes a second set of outputs 450. Outputs 450 are obtained by configuring each two dimensional logical array 300-k1 of switching block 400 as described in connection with FIG. 14A for outputs 350. As will be appreciated some inputs 410 to block 400 may be directed to outputs 420 while others are simultaneously directed to outputs 450. Similarly, switching block 600' includes an additional set of inputs 640'. Inputs 640' are obtained by configuring each two dimensional logical array 300-k2 of switching block 600' as described in connection with FIG. 14A for inputs 340. Again, it will be appreciated that both inputs 610' and inputs 640' of block 600' may simultaneously be direct to different outputs 620'. As shown in FIG. 24, switching block 400' is preferably positioned so that the outputs 450 from switching block 400 may travel directly from block 400 to switching block 400', and similarly switching block 600' is preferably positioned so that the outputs 620 from block 600 may travel directly from switching block 600 to block 600'. Again, careful alignment helps ensure that the paths of output signals from one block are colinear with the paths of inputs signals to the adjacent block.

As a result, in strictly non-blocking switching configuration 800 two alternative non-blocking paths exist for any input 410 to be directed to any output 620': 1) through blocks 400, 500, 600, and 600' or 2) through blocks 400, 400', 500', and 600'. If only the first path is used, block 600' is effectively configured in a transparent or bypass mode where only inputs 640' are used, and blocks 500' and 600' are not used. Similarly, if only the second path is used, block 400 is effectively configured in a transparent or bypass mode where only outputs 450 are used, and blocks 500 and 600 are not used.

In switching configuration 800, connectivity between any input and output is ensured even when instructions to provide new desired switching connections are received, and so no rearrangement is required. For instance, if, after a first input-output desired switching configuration has been established, instructions to change certain connections occur, the new desired switching configuration can first be established in the blocks that are currently not being used, i.e. blocks 500 and 600 or blocks 500' and 600'. When this occurs, part of the switched outputs 620' may be provided along the first path (400-500-600-600') and part along the second path (400-400'-500'-600'). In addition to strictly non-blocking capability, the existence of the dual paths also provides for a back-up should any block or any switch in any block malfunction or is otherwise unavailable. Thus switching configuration 800 provides a very high degree of redundancy, strict non-blocking performance, and added reliability by doubling the size and number of switches of switching configuration 700 (i.e. for $M=N=P=Q^{1/2}$, a total of $6Q^{3/2}$ switches are required). The largest possible free space path length from any input to any output in configuration 800 only increases by one block length (i.e. it is $6Q^{1/2} \cdot d$ or another 5 mm for the exemplary 100×100 switching device described above). Furthermore, where the switches include mirrors, the number of switches encountered by a signal traveling through switching configuration 800 remains at three, the same as with switching configuration 700. Therefore, any increase in insertion loss of switching configuration 800 with respect to switching configuration 700 is relatively minimal.

For other applications, various different switching configurations may be provided by using any number of three-dimensional switching blocks and by aligning them in different positions with respect to one another.

To illustrate, the switches in the above described common substrate MEMS switch 100 configuration 290 of FIG. 12 may include collimators, prisms or lens as the switching elements 106. These switches may direct a particular input to different output positions depending on the position of the switching element relative to the incoming input signal. The use of collimation lenses as switching elements in this manner is described in U.S. Pat. No. 6,002,818 to Fatehi et al., the contents of which are incorporated herein by reference.

More specifically, each switch in a first two-dimensional common substrate configuration (e.g. configuration 290 of FIG. 12) may be provided with a collimator switching element with the direction of actuation (or travel path) of each collimator being along the directions of columns 294. Each of a two dimensional group of input optical signals is incident, preferably at an angle of incidence of 0°, on each switch. A second two-dimensional common substrate configuration, in parallel with the first, has the outputs of the first common substrate configuration as inputs. The second common substrate configuration is also be provided with collimator-based switching elements, but with the direction of actuation of each collimator being along the directions of rows 292. It will be appreciated that the first and second common substrate configurations are physical substrate layers similar to the layers 405 in FIG. 17, but in the present example the first and second common substrate configurations have the same number of switches thereon.

By actuating the collimator of a switch in a particular column of the first configuration to one of a plurality of operative positions, the input of that switch may be directed to the output of any switch in the same column, and to the corresponding input of the second common substrate configuration of switches. Similarly, by actuating the collimator of a switch in a particular row of the second configuration to one of a plurality of operative positions, the input of that switch may be directed to the output of any switch in the same row. In effect, the first common substrate configuration of switches acts to switch optical signals between the columns of inputs and outputs, and the second common substrate configuration of switches acts to switch between the rows of inputs and outputs (similar in operation to switching blocks 400 and 500 in FIG. 19A). Preferably, a third common substrate configuration between the first and second common substrate configurations is also used. The switches in the third common substrate configuration are used to redirect the optical signals out of the first common substrate configuration so that they are incident at 0°, on each switch in the second (row exchanging) common substrate configuration. Similarly, a fourth common substrate configuration can be added after the second common substrate configuration to reorient the signals so that they emerge in a normal direction. (Alternatively, the third common substrate configuration may also be positioned after the second common substrate configuration.). Thus, with at least two, and preferably four, aligned physical substrate layers (i.e. each common substrate configuration) as described above, the input optical signal of any column and row can be directed to the output optical signal of any column and row.

As indicated above, the input and output optical signals of conventional MEMS switches travel parallel to the surface of the switch substrate. As a result, prior art arrays of conventional MEMS optical switches inherently favor a two-dimensional configuration as switching only occurs above the surface of a single two-dimensional physical switching layer, without permitting the signals to travel among different physical substrate layers. Furthermore, conventional MEMS optical switches typically have optical switching elements fabricated within a substrate surface, so that the switching element or mirror is disposed vertically with respect to the substrate or tilts with respect to the substrate, making these switches sensitive to positioning inaccuracies. Moreover, because of the erected configuration of conventional optical switching elements sufficient separation must be provided between two-dimensional switching layers for the switching operation on top of each layer to take place. Due to these and other design difficulties, a highly compact and efficient three-dimensional switching configuration of conventional MEMS switches has not been provided in the prior art.

The fabrication of a MEMS switch 100 is discussed above and described in more detail in applicant's co-pending U.S. patent application Ser. No. 09/619,013. Fabrication is conveniently carried out using conventional micromachining and microelectronic techniques, and preferably surface micromachining techniques are used to build up the switch structure in layers of thin films on the surface of a suitable wafer substrate. In general, however, switches 330 in two-dimensional switching configurations 300 or switches 430 in three-dimensional switching blocks 400 of the present invention may comprise any switch capable of selectively performing a switching operation so that in at least one of the operative positions of the switch, the optical signal directed at the switch travels through a penetrable zone of the switch's substrate layer. In these switches, the optical signals do not travel parallel to the substrate surface. The fabrication techniques described in connection with MEMS switch 100 can also be applied to any suitable MEMS switch 330 or 430, and again preferably surface micromachining techniques are used. Furthermore, as will be appreciated, one- or two-dimensional configurations of switches 330 or 430 lying on a single physical substrate layer (i.e. a common substrate as in FIG. 12) may be conveniently and simultaneously fabricated using the same fabrication techniques.

In accordance with the present invention, a plurality of physical substrate layers each having a one-dimensional set of switches 330 fabricated thereon may be combined to form a two dimensional M×N cross-connect array, such as switching configurations 300 (FIGS. 14A) or 302 (FIG. 16A). The structure of two-dimensional cross-connects according to the present invention is more elaborate than that of a prior art single layer of conventional MEMS switches arranged in a two-dimensional array. However, the two dimensional cross-connect arrays of the present invention provide for efficient switching, particularly when MEMS switches 100 are employed, and can be easily and readily extended into three dimensional cross-connect blocks.

As in the case of a single switching device, fabrication of the physical switching layers 305 or 405 is preferably carried out on top of a substrate wafer surface. The substrate may be characterized by different dimensions, thickness, materials, and/or surface preparation. Generally a cross-connect can be prepared on any suitable type of substrate material, since the substrate material has no impact on the switches, aside from its surface preparation and physical dimensions. The substrate layer is generally prepared using macro techniques. The substrate layer is also preferably used to form the microelectronic circuitry for operating switches 330 or 430, and may further optionally be used for alignment of the input and output optical fibers (in this case, specific properties of the substrate material such as its crystallographic planes can be exploited). Silicon is preferably used as the substrate material, but different materials may also be used.

To fabricate a three-dimensional switching configuration 400 (or array 300) according to the present invention, the switching configuration of each physical layer 405 (or 305) is separately fabricated and then the layers are properly aligned. Preferably, all of the physical layers are initially fabricated on the same substrate layer, separated from one another, stacked and aligned, and then bonded to form switching block 400.

Figure 25:
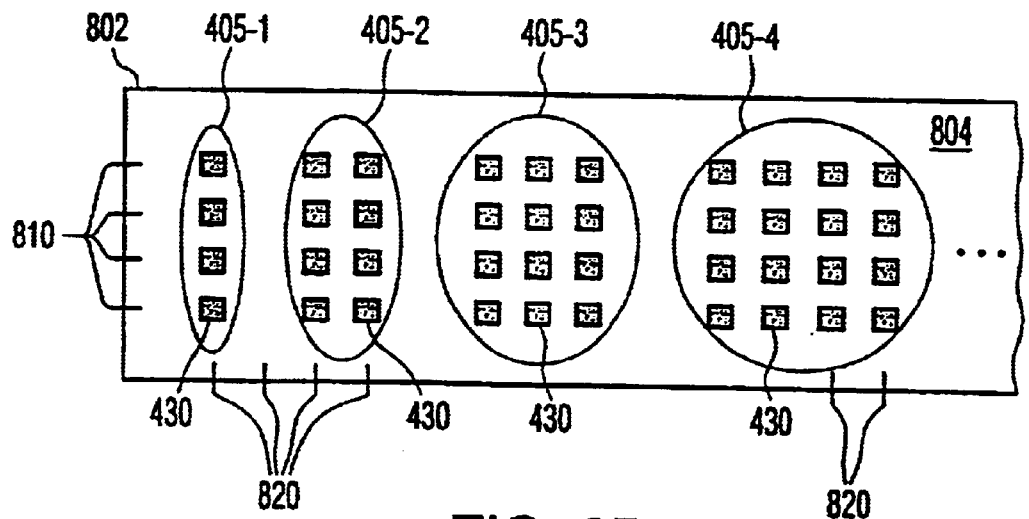
FIG. 25 illustrates a preferred method of fabricating the physical layers in a 4×4×4 three-dimensional cross-connect block have mirror-based switches that receive and redirect the input and output signals at an angle of incidence and reflection of 45°.

FIG. 25 illustrates a preferred method of fabricating a 4×4×4 three-dimensional switching block 400 comprising switches 430 that have mirrors as switching elements and that receive and redirect the input and output signals at an angle of incidence and reflection of 45°. Although other fabrication methods may also be used, the preferred method allows for highly accurate construction of the switching devices of the present invention. Furthermore, the method can also be adapted for other types of switches and/or switching elements.

Referring to FIG. 25, on the surface 804 of a substrate 802 a plurality of switches 430 are fabricated. The switches 430 are arranged on substrate 802 in rows 810 and columns 820. Generally there are P rows 810, i.e. one for each logical layer in switching block 400, and so 4 rows are shown in FIG. 25. If a two-dimensional switching device 300 or 360 is being constructed, K=1 and so only one row 810 of switches is required). Each physical layer 405 of switches 430 is fabricated on substrate 802. As indicated, switching block 400 includes (M+N−1) which in this case is seven physical substrate layers (only max(M,N) or 4 layers would be required for a 4×4×4 pyramidal configuration). As shown, for an M=N configuration, each physical layer 405 comprises an increasing number of columns of switches starting at one column for a first layer 405 until an M'th 405 layer having M columns. Subsequent physical layers 405 have a decreasing number of columns until an (M+N−1)'th layer 405 is reached with again only one column (these subsequent physical layers are not shown in FIG. 25). Generally, for M=N and where the index a is used to denote, in order, the a'th physical layer, that layer has $$\max(M,N) - |\max(M,N) - a|$$

columns, or equivalently P·(max(M,N)−|max(M,N)−a|) switches, where |x| represents the absolute value of x. Conveniently, to achieve accurate spacing between physical layers 405 on substrate 802, the rows 810 and columns 820 are uniformly spaced along substrate 802, and the physical layers 405 are separated from one another by an empty column (i.e. a column with no switches).

Figure 26:
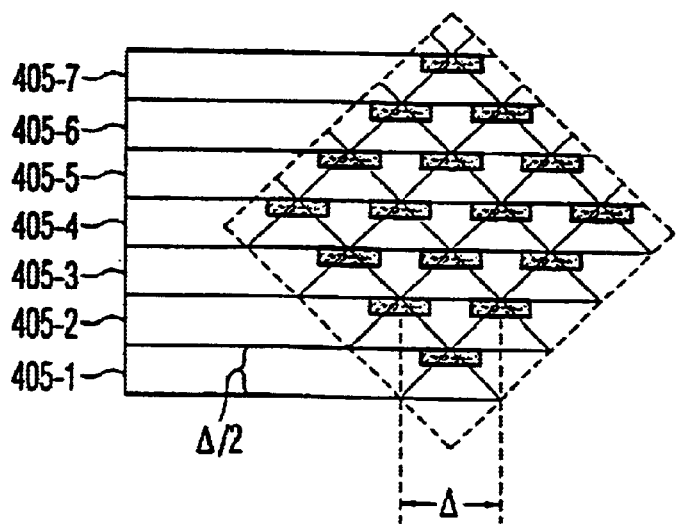
FIG. 26 illustrates the aligning and stacking of the layers in FIG. 25.

Next, substrate 802 is divided to separate the physical layers 405 from one another. To construct block 400, the physical layers 405 are carefully aligned in order, one on top of the other, as shown in the side view of block 400 in FIG. 26. For the present example in which switches 430 include mirrors and the input and output are angled at 45° to each switch, the layers are aligned so that the switches in a layer are directly above or below a location that is half-way between two switches in the next layer, as illustrated in FIG. 26. Thus, for example, the second physical layer 405-2 is placed on top of the first physical layer 405-1 so that the switch in layer 405-1 is half-way between the two switches in physical layer 405-2. Similarly, the third physical layer 405-3 is placed on top of the second physical layer 405-2 so that each of the switches in physical layer 405-2 is half-way between a pair of switches in physical layer 405-3, and so on. Furthermore, since the input and output are at 45° to each switch in this example, the height of substrate 802 and hence the height of each physical layer 405 should be half the separation distance Δ between switches in each physical layer 405 (ignoring the height of the mirror above the switch substrate surface), as indicated in FIG. 26.

Figure 27A:
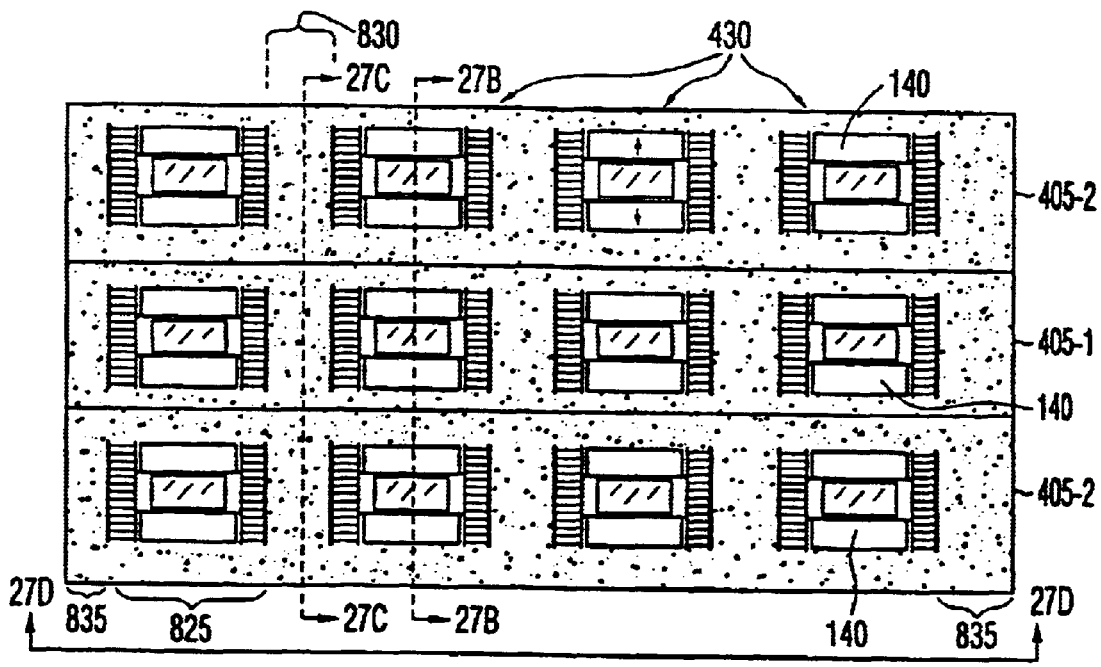
FIGS. 27A–27D illustrate the structure of and manner of stacking the physical layers in FIG. 26 in more detail.
Figure 27B:
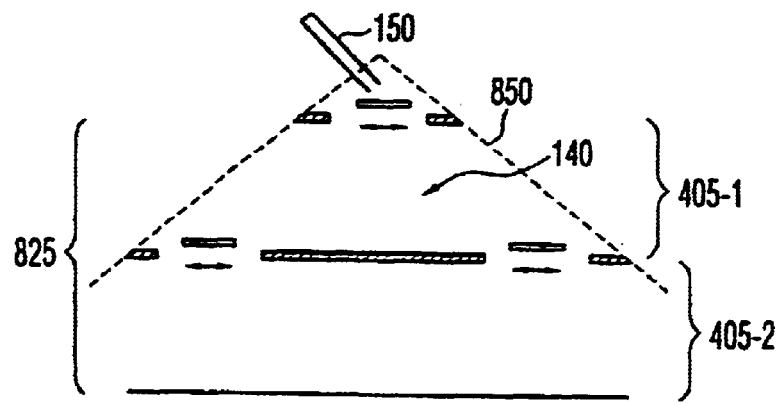
Figure 27C:
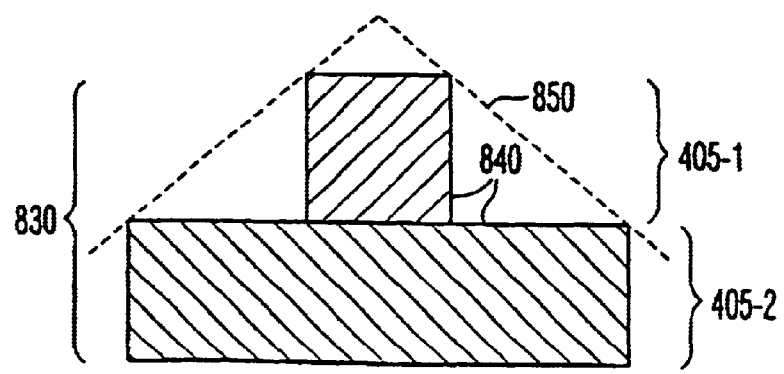
Figure 27D:
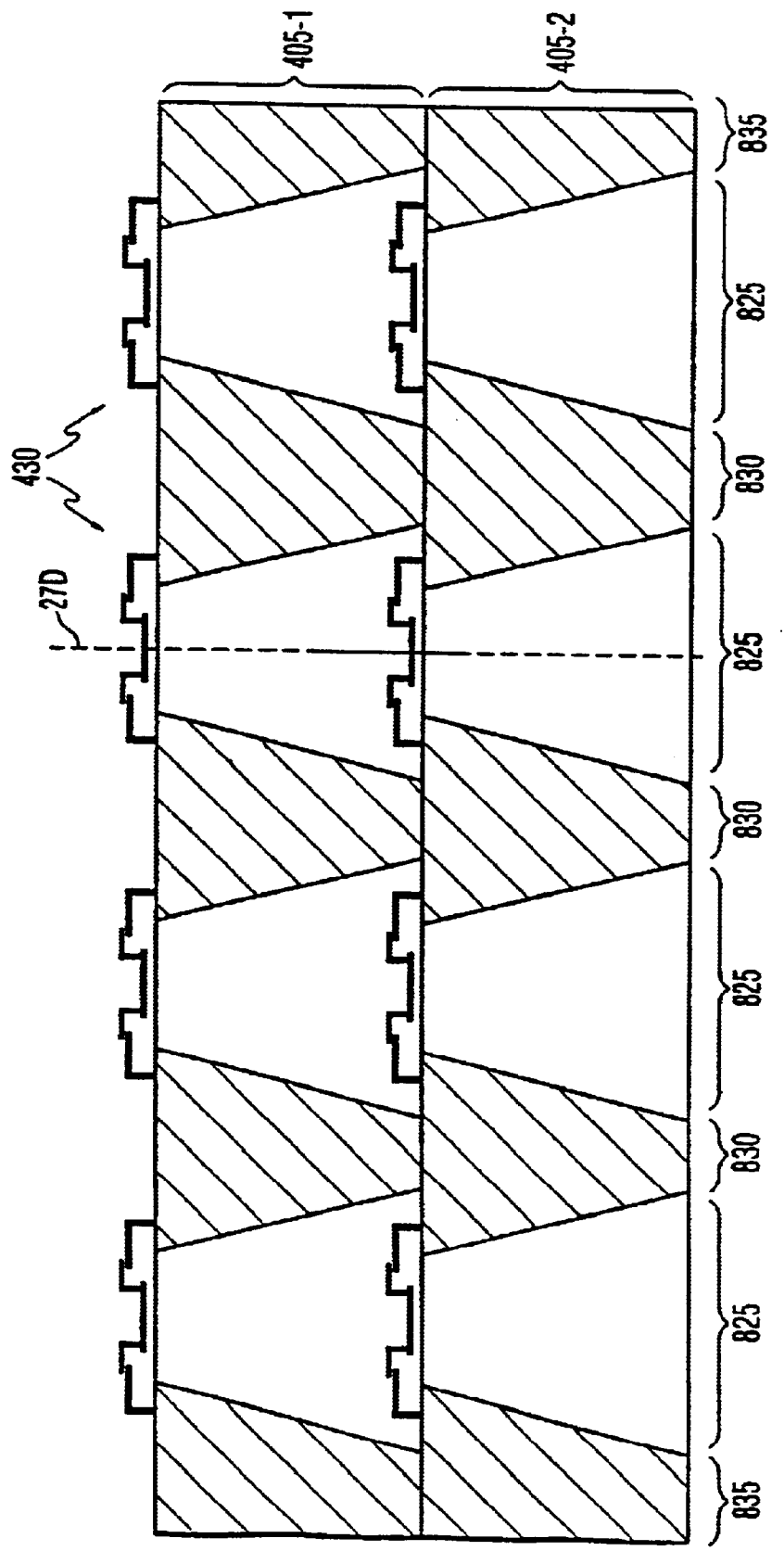

FIGS. 27A–27D illustrate the structure of and manner of stacking the physical layers 405 in more detail. FIG. 27A shows a plan view of layer 405-1 and layer 405-2 stacked together. FIG. 27B is a cross-sectional view taken along the line 27B—27B in FIG. 27A, and FIG. 27C is also a cross-sectional view taken along the line 27C—27C in FIG. 27A. FIG. 27D is a side view taken from the direction indicated by line 27D—27D. As shown, in FIG. 27B, the penetrable zones 140 in different physical layers 405 are linked so that the optical signals can travel freely between physical layers 405 within a given logical layer 825. Preferably, the penetrable zones 140 of the physical layers 405 are apertures or holes. As FIG. 27C illustrates, the region 830 between logical layers 825 preferably includes substrate material 840 which may be used to bond physical layers 405 to one another to provide an integrated switching device and maintain accurate alignment. Anodic, fusion, eutectic, adhesive, or other bonding techniques may be used. Furthermore, if necessary, and as shown in FIG. 27D, the substrate material 840 in region 830 may be tapered to provide space for switches 430 (including the corresponding actuator) on an adjacent physical layer. Note that the plane in which the optical signals travel through logical layers 825 is indicated by the broken line 860 in FIG. 27D.

Figure 28:
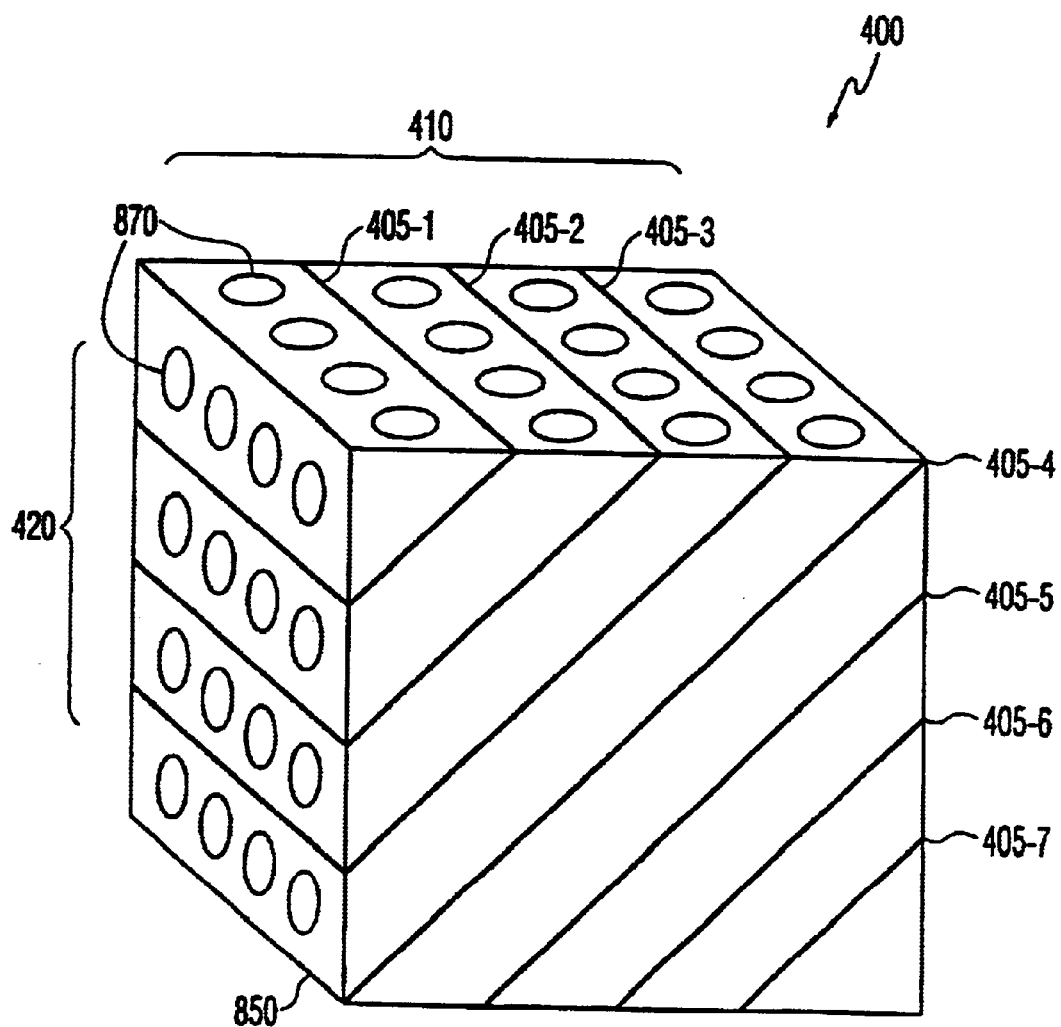
FIG. 28 illustrates a complete three-dimensional switching block after fabrication.

Once the physical layers 405 have been properly and accurately aligned, they are preferably bonded together using anodic, fusion, or adhesive bonding techniques. Bonding preferably occurs between the regions 835 (see FIG. 27D) of physical layers 405, as well as optionally, between the regions 830 of physical layers 405. FIG. 28 shows a complete switching block 400 with input and output ports 870. Optionally, as also shown in FIG. 28, the physical layers may be diagonally shaped at their sides 850 so that the overall structure of cross-connect 400 is shaped like a cube or box once bonded together. The diagonal shaping of the layers is indicated by the broken outline 850 in FIGS. 27B and 27C. Further alignment steps are made to ensure that all input and output fibers are accurately positioned with respect to switching block 400. In addition, where additional switching blocks will be used to provide a more elaborate cross-connect configurations, e.g. the Clos configuration 700, the additional switching blocks are also rotated appropriately and then carefully aligned with switching block 400. The various switching blocks are also then preferably bonded to one another.

If switching block 400 is to have a pyramidal configuration, then physical layers 405-5, 405-6, and 405-7 are not used and need not be bonded to the other layers. In this case, physical layer 405-4 may simply act as a static reflecting base plane as described above.

The number of logical layers in switching device 400 is dictated by the number of rows 810 of switches in FIG. 25. Adding rows 810 simply corresponds to extending the physical layers 405. Thus, advantageously, the above fabrication steps readily provide a switching block with any number of logical layers (and hence input and output capacity) to be fabricated. As indicated, a two dimensional switching device is obtained when only one row 810 is used. As a result, two dimensional switching configurations of the present invention are easily extended into three dimensions and vice versa.

The above described fabrication method effectively allows the fabrication of a three-dimensional switching block using two-dimensional micro-fabrication methods, with subsequent alignment and bonding preferably being carried out using high quality and well-established two-dimensional microfabrication methods. It will be appreciated that the above described fabrication steps may vary depending on the type of switch 430, the type of switching element used in each switch, and/or the angle of the input and output optical signals with respect to the switches. The switch 430 is preferably a MEMS switch 100 having a mirror as switching element 106, taking advantage of the considerably enhanced quality, planarity, and performance of the switches when the mirror is fabricated and positioned in parallel above the switch's substrate surface. Furthermore, although other fabrication steps may be used to construct the switching devices of the present invention, the above described technique is preferred.

Figure 29:
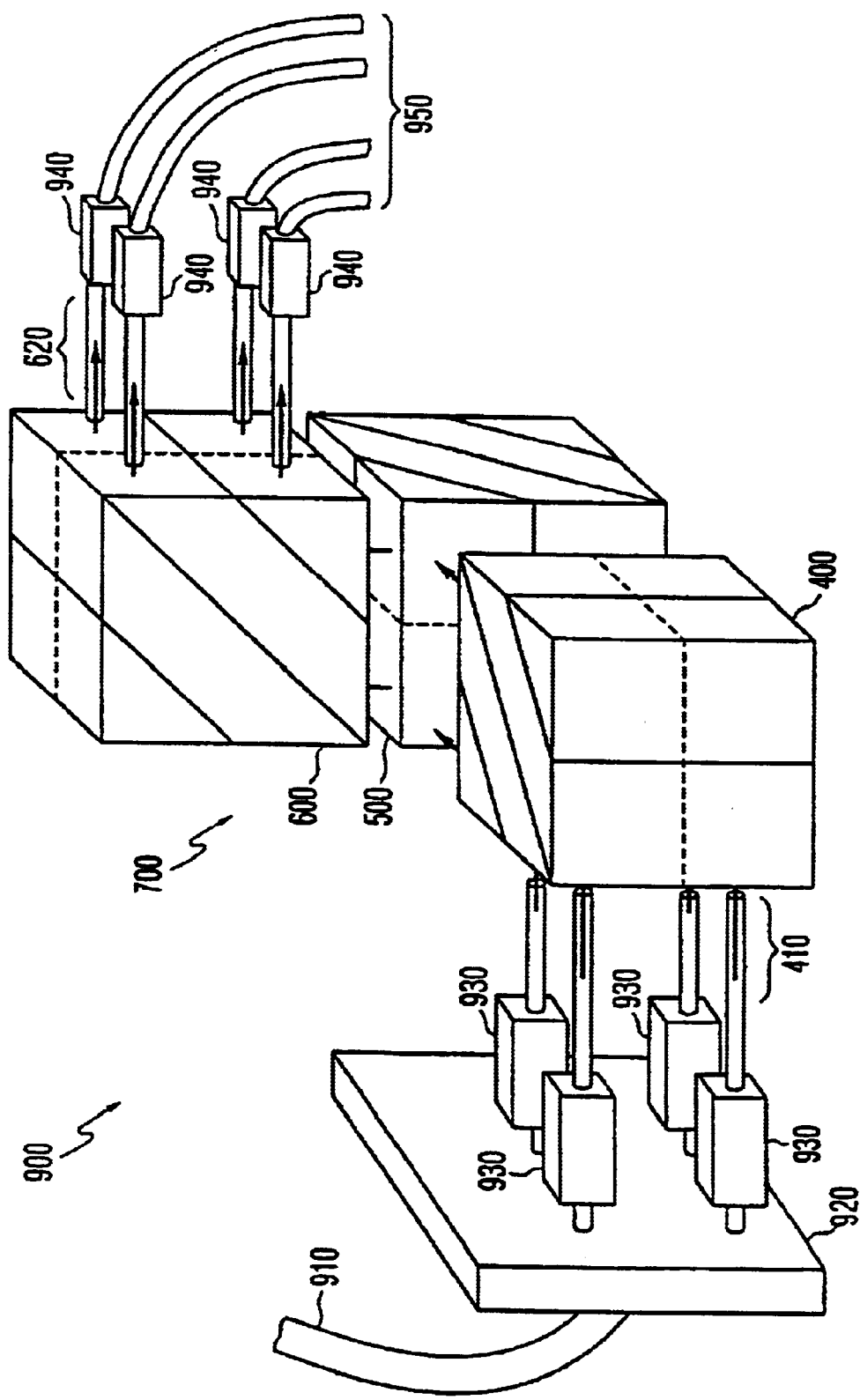
FIG. 29 illustrates the use of a switching device in a WDM network.
Figure 30:
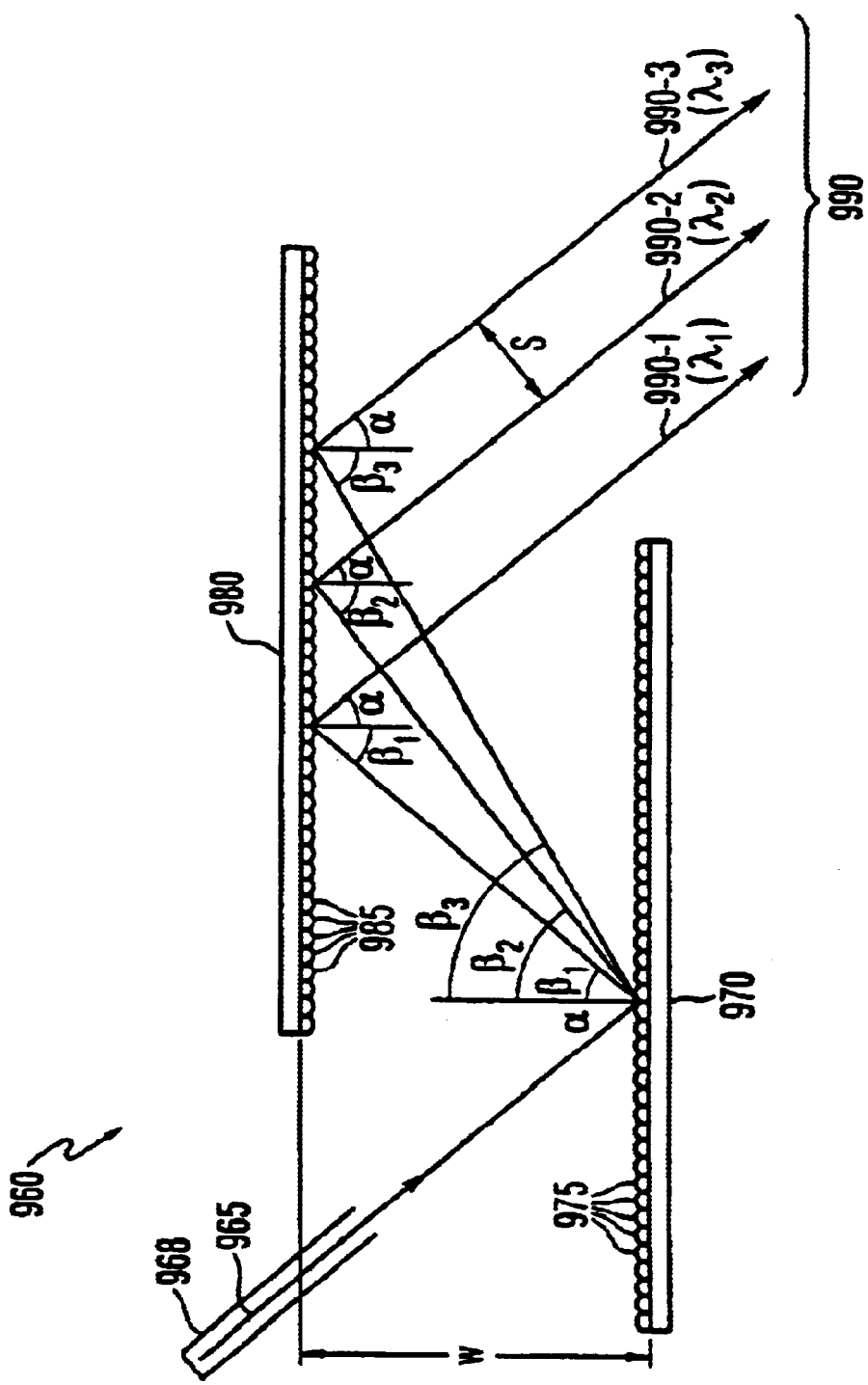
FIG. 30 shows a configuration of a multiplexer/demultiplexer according to the present invention.

The switching configurations of the present invention are particularly well-suited for use in an all-optical communication network (i.e. without any switching to the electrical domain being required). In the case of a WDM network, such as the network 900 shown in FIG. 29, an optical cross-connect may be used for switching input optical signals of different wavelengths between a large number of input paths and a large number of output paths. Referring to FIG. 29, an input fiber carrying a WDM signal is received at a wavelength demultiplexer 920 which splits the WDM signal in fiber 910 into its component wavelength signals. A novel and preferred wavelength demultiplexer for this purpose is shown in FIG. 30 and described further below. The component wavelength signals may then be converted to different wavelengths or each may be converted to a standard wavelength at wavelength converters 930. Alternatively, if cross-connect 700 used in network 900 operates independently of wavelength, for example because its switches include mirror-based switching elements, wavelength converters 930 may be omitted. Cross-connect 700, shown in FIG. 29 as a Clos cross-connect configuration, performs the desired switching operation between input 410 and outputs 620 as described above. Switched outputs 620 may then, if necessary, be provided to wavelength converters 940 to revert back to a desired WDM wavelength. The switched signals in fibers 950 may then be provided to regenerators, multiplexers, and other network elements (not shown),a s required. In particular, any multiplexer used may also be based on FIG. 30 as described below. Furthermore, other wave shaping or controlling elements such as lenses or prisms may be inserted at the inputs and outputs of blocks 400, 500, and 600 in Clos cross-connect 700 to help minimize losses.

The present invention further provides a multiplexer/demultiplexer configuration which may be used in WDM optical networks, for example as shown in FIG. 29. FIG. 30 shows the multiplexer/demultiplexer configuration 960 in a demultiplexer mode. Multiplexers are used to combine the individual wavelength signals into a single WDM signal and demultiplexers are used to separate the individual wavelength signals from the WDM signal. Many prior art demultiplexers use diffraction gratings to combine and separate the signals, but other technologies are also used.

Referring to FIG. 30, the demultiplexer of the present invention receives a wavelength division multiplexed signal 965 having a plurality of signal components, each occupying a distinct wavelength of light, multiplexed within it. Configuration 960 includes two diffracting reflection gratings 970 and 980 (i.e. a diffraction grating ruled on a reflecting surface) which are positioned in parallel with one another and separated by a distance w. Diffracting reflection grating 970 includes a series of diffraction elements 975 that face diffracting reflection grating 980. Similarly, grating 980 includes a series of diffraction elements 985 that face grating 970. In operation, a collimated input WDM signal 965 after emerging from a fiber 968 is incident on grating 970 at a predetermined angle of incidence α. The grating elements 975 reflect the different wavelength component (e.g. $\lambda 1$, $\lambda 2$, $\lambda 3$) rays at different diffraction angles (e.g. $\beta 1$, $\beta 2$, $\beta 3$) depending on the wavelength. In other words, the sum of the incidence angle α plus the diffraction angle β is a function of the wavelength λ of each component. The wavelength components diffracted by grating 970 are each then directed, at different angles of incidence β on grating 980. Again, the grating elements 985 reflect the different wavelength component rays at different diffraction angles depending on the wavelength, and the sum of the incidence angle α plus the diffraction angle β is a function of the wavelength λ of each component. Consequently, the angle of reflection of each of the separated wavelength component signals from grating elements 985 is again α, and as a result the separated wavelength component signals 990 exit device 960 in parallel to one another, as shown. The distance s between the separated wavelength component signals 990 is determined by several parameters including the separation distance w, the spacing of diffraction elements 975 and 985, and the angle a with which the input WDM signal is incident on grating 970. The separated wavelength component signals 990 also exit device 960 at the angle α.

When acting as a demultiplexer, as shown in FIG. 30, the parallel outputs 990 from device 960 can conveniently be aligned with and directed into a one dimensional set of inputs of an optical cross connect or switching device, for example inputs 1-M of a particular logical layer of switching block 400. The separation distance s can be appropriately set for this purpose, by varying the parameters mentioned above. Advantageously, the use of a demultiplexer 960 in this manner requires the precise fiber alignment of only one fiber—fiber 968 of the input WDM signal. Furthermore, by simply reversing the direction of signals 990 and signal 965, configuration 960 acts as a multiplexer to combine a set of parallel input signals 990, for example outputs 1-N of a particular logical layer of switching block 600, into a single WDM signal 965. Thus a demultiplexer and corresponding multiplexer 960 can be conveniently inserted into the WDM network 900 of FIG. 29, as mentioned above.

All of the switching configurations of the present invention preferably receive all inputs in parallel and direct all outputs in parallel, and the multiplexer/demultiplexer device 960 of the present invention is advantageous since it can directly couple signals to and from these switching devices or cross-connects. Multiplexer/demultiplexer device 960 may be fabricated using conventional micromachining techniques.

Figure 31:
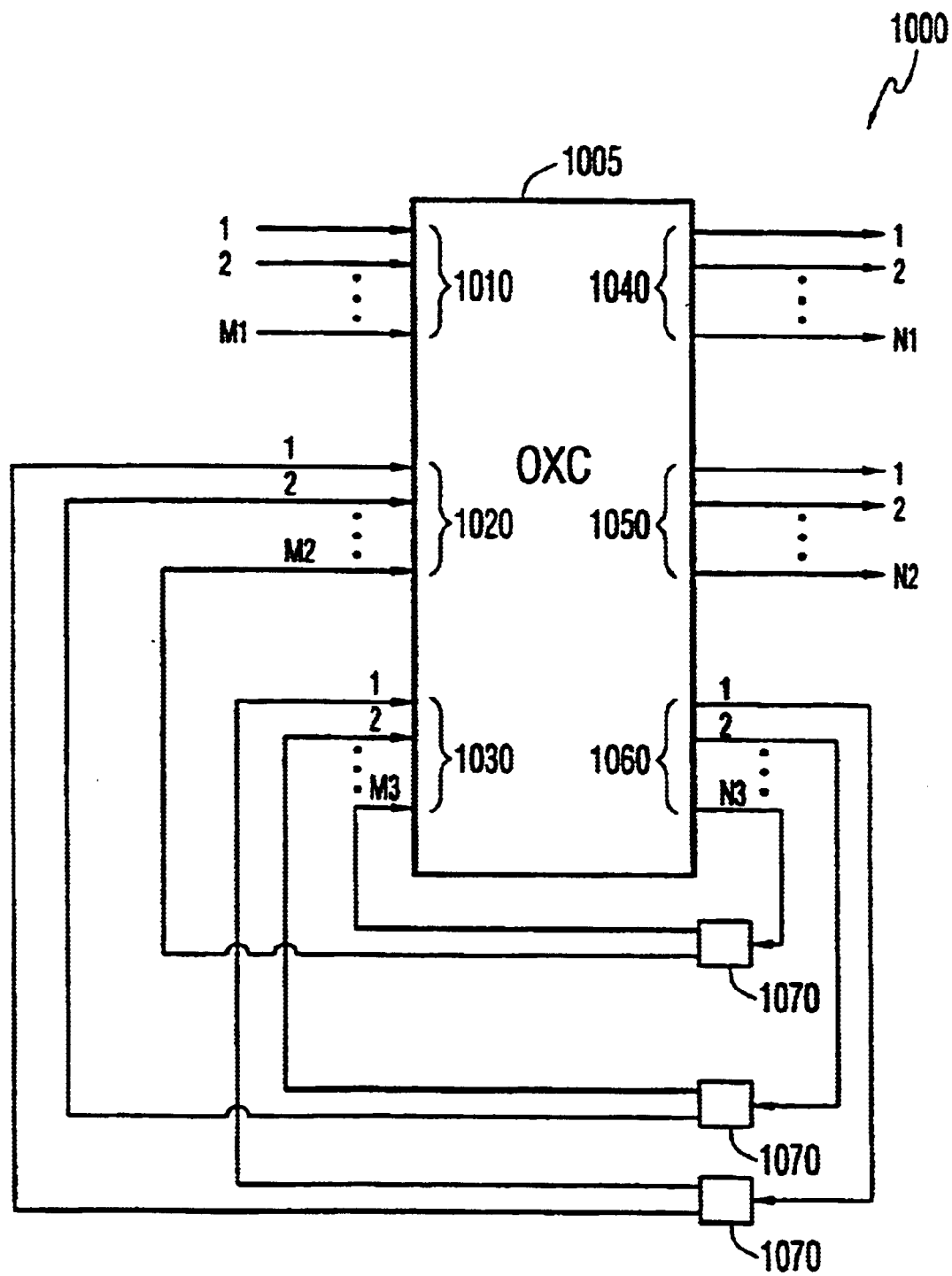
FIG. 31 shows a configuration for adapting a switching network to provide a multicasting or broadcasting capability for one or more inputs.

FIG. 31 shows another configuration embodiment 1000 of the present invention used to adapt a switching network to provide a multicasting or broadcasting capability for one or more inputs. The configuration 1000 may be applied to any of the two-dimensional or three-dimensional switching devices provided by the present invention, but, more generally, can also be used for any type of switching configuration 1005.

Referring to FIG. 31, switching configuration 1005 includes three sets of inputs 1010, 1020,and 1030. The outputs of switching configuration 1005 are also divided into at least two and preferably three sets, 1040, 1050, and 1060. The first set of inputs 1010 acts as a main set of M1 inputs to switching configuration 1005 having a multicast capability. The first set of outputs 1040 are employed as the main set of N1 outputs cross-connected, as described above, with the M1 inputs 1010. In normal (non-multicast and non-broadcast) operation, switching is only performed between the inputs 1010 and outputs 1040.

The remaining sets of inputs and outputs may be used for broadcast and/or multicast purposes. As shown in FIG. 31, each of the N3 outputs 1060 is provided to a beam splitter 1070 which splits the signal into two signals. One of each of the split signals is directed to an input 1020 and the other split signal is directed to an input 1030. Thus, N3=M2=M3 in the configuration 1000 of FIG. 31. In multicasting, the input 1010 to be multicast is directed to an output 1060 where it is split and fed back as an input 1020 and an input 1030. The split input 1020 is switched to an appropriate output 1040, while the split input 1030 is again directed to an output 1060 for further splitting and feedback. This process is continued until the desired multicasting switching of outputs 1040 is achieved or until all outputs 1040 carry the desired input signal (broadcasting). Different combinations of inputs 1010 may be multicasted to outputs 1040 via configuration 1000. Each beam splitter 1070 may comprise, for example, an integrated optic device or a partially reflective and partially transmissible mirror switching device. Preferably, amplifiers (not shown) are also inserted in the paths of the split signals to ensure that the split signals have sufficient power. Outputs 1050 may be used for additional broadcasting, multicasting, or other applications.

All of the switching configuration embodiments of the present invention preferably incorporate MEMS switches 100, however any type of optical or wave switch may also be used, be it MEMS, liquid crystal, electro-optic, or otherwise in nature. For example, the reduction in size and number of switches in the triangular shaped switching device of FIGS. 16A–16B provides advantages for Mirrors are also preferred as the switching elements, but any element capable of varying the characteristics of an optical or wave signal may alternatively be used. It should also be noted that the configuration of the inputs and outputs at an angle of 45° to the switches in most of the illustrated embodiments is also preferred but not necessary to the present invention. The input and output angles may be varied, and any of the switching devices may have a skewed configuration similar to the embodiment of FIG. 16B. Furthermore, the additional sets of inputs and outputs described in connection with the embodiment of FIG. 14A may also be present in other embodiments to provide various different functions, including as a possible mechanism for controlling the switching position or state of each switch. In addition, while square (i.e. M=N) or cubic (i.e. M=N=P) switching array configurations will be desirable in most applications, it will be appreciated that the present invention is equally applicable to any variations on these array configuration parameters.

Also, while the embodiments of the present invention are particularly well-suited for optical communications, they may also be exploited in other fields such as the communication of other types of wave signals (e.g. acoustic waves) or the field of optical computing. In optical computing, digital calculations are performed using optical devices to perform logic, memory, and/or arithmetic functions. A device having the switching capabilities of the present invention may be used as part of an optical memory or as part of an optical computing device.

While the invention has been described in conjunction with specific embodiments, it is evident that numerous alternatives, modifications, and variations will be apparent to those skilled in the art in light of the foregoing description.

What is claimed is:

1. A switching device for receiving an input signal and providing the signal to a particular output signal path, the switching device comprising a plurality of physical substrate layers each having one or more switches thereon, and wherein the input signal travels through a penetrable zone of at least one of the physical substrate layers, and the input signal is an optical signal and the penetrable zone comprises an optically transparent material.

2. The switching device of claim 1 wherein the penetrable zone comprises an aperture in the physical substrate layer.

3. The switching device of claim 1 wherein each of the plurality of physical substrate layers are aligned in parallel with one another.

4. The switching device of claim 1 wherein the switches are microelectromechanical (MEMS) switches and each of the MEMS switches includes a switching element that is generally planar and disposed in parallel to the physical substrate layer on which the switching element resides.

5. The switching device of claim 1 wherein the switches are microelectromechanical (MEMS) switches and each of the MEMS switches includes a mirror having a reflective surface.

6. The switching device of claim 5 in which each mirror has opposing reflective surfaces.

7. The switching device of claim 1 wherein the MEMS switches are arranged in a two-dimensional array.

8. The switching device of claim 7 wherein the switching device receives a plurality of M input signals and provides a plurality of N output signals.

9. A The switching device of claim 8 wherein M equals N.

10. The switching device of claim 1 wherein the MEMS switches are arranged in a three-dimensional array comprising a plurality of similar two-dimensional arrays each of the two-dimensional arrays defining a logical layer of the device, and wherein the input signal travels in only one of the logical layers.

11. The switching device of claim 10 wherein each of the logical layers of the switching device receives a plurality of M input signals and provides a plurality of N output signals, the M input and N output signals travelling only in that logical layer.

12. The switching device of claim 11 wherein M equals N.

13. The switching device of claim 11 wherein the switching device has (M+N−1) physical substrate layers.

14. The switching device of claim 11 wherein the switching device has max(M,N) physical substrate layers.

15. A switching device for receiving a plurality of M input signals and providing a plurality of N output signals each input signal being directed along a path into said device and each output signal being directed along a path out of said device said switching device comprising a plurality of switches arranged in a two-dimensional array, each of the switches being located at an intersection in which a projection of the path of one input signal meets a projection of the path of one output signal, wherein:

at least two of said switches reside on distinct physical substrate layers in the switching device, and at least one of said signals travels through a penetrable zone of one of the physical substrate layers; and one switch is located at each intersection in which a projection of the path of one of the input signals meets a projection of the path of one of the output signals.

16. The switching device of claim 15 wherein each switch resides on one of the physical substrate layers near a penetrable zone of that physical substrate layer, so that in at least one operative position of the switch a signal input to or output by the switch passes through that penetrable zone.

17. The switching device of claim 16 wherein each switch includes a mirror, the mirror not affecting any signal input to the switch when in a first position and reflecting any signal input to the switch when in a second position.

18. The switching device of claim 17 wherein, for each of the switches, when the mirror is in the second position any signal input to the switch is angled at 45° with respect to the mirror.

19. The switching device of claim 16 wherein each switch is a microelectromechanical (MEMS) switch.

20. The switching device of claim 19 wherein each MEMS switch comprises a generally planar switching element disposed in parallel to the surface of the physical substrate layer on which the switch resides and an actuator operatively; engageable with the switching element for moving the switching element between different positions in a plane parallel to the surface of the physical substrate layer.

21. The switching device of claim 20 wherein the switching element of each MEMS switch comprises a mirror, the mirror not affecting any signal input to the switch when in a first position in said plane and reflecting any signal input to the switch when in a second position in said plane.

22. The switching device of claim 21 wherein, for each of the MEMS switches, any signal input to the switch is angled at 45° with respect to the mirror.

23. The switching device of claim 15 wherein each input signal is denoted as an i'th input signal where i is an integer and $1 \leq i \leq M$ and each output signal is denoted as a j'th output signal where j is an integer and $1 \leq j \leq N$, the path of the first input signal and the path of the first output signal being in closest proximity among the input and output signal paths, the path of the M'th input signal and the path of the N'th output signal being most distant among the input and output signal paths, the paths of any intermediately denoted input signals being located incrementally between the first and M'th input signal paths, and the paths of any intermediately denoted output signals being located incrementally between the first and N'th output signal paths, and wherein:
  one switch in a first group of switches is located at each intersection in which a projection of the path of the i'th input signal meets a projection of the path of the j'th output signal for which the value of i+j for that intersection is less than or equal to max(M, N); and
  one switch in a second group of switches is located at each intersection in which the path of the i'th input signal meets the path of the j'th output signal for which the value of i+j for that intersection equals max(M, N)+1.

24. The switching device of claim 23 wherein
  each switch in the first group of switches resides on one of the physical substrate layers near a penetrable zone of that physical substrate layer, so that in at least one operative position of the switch a signal input to or output by the switch passes through that penetrable zone; and
  each switch in the second group of switches is located on the same physical layer and is static.

25. The switching device of claim 24 wherein
  each switch in the first group includes a mirror having first and second reflective surfaces, wherein when the mirror is in a first position the mirror does not affect any signal input to the switch, and when the mirror is in a second position the mirror reflects any signal input to the switch; and
  each switch in the second group includes a static mirror that reflects any signal input to the switch.

26. The switching device of claim 25 wherein
  for each of the switches in the first group, when the mirror thereof is in the first position any signal input to the switch is angled at 45° with respect to said mirror; and
  for each of the switches in the second group any signal input to the switch is angled at 45° with respect to the mirror thereof.

27. The switching device of claim 24 wherein each switch in the first group is a microelectromechanical (MEMS) switch.

28. The switching device of claim 27 wherein each MEMS switch in the first group comprises a generally planar switching element disposed in parallel to the surface of the physical substrate layer on which the switch resides and an actuator operatively engageable with the switching element for moving the switching element between different positions in a plane parallel to the surface of the physical substrate layer.

29. The switching device of claim 28 wherein
  the switching element of each MEMS switch in the first group comprises a mirror having first and second reflective surfaces, the mirror not affecting any signal input to the switch when in a first position in said plane and reflecting any signal input to the switch when in a second position in said plane; and
  each switch in the second group includes a static mirror parallel to the surface of the physical substrate layer on which the switch resides that reflects any signal input to the switch.

30. The switching device of claim 29 wherein for each of the MEMS switches, any signal input to the switch is angled at 45° with respect to the mirror thereof.

31. The switching device of claim 15 further comprising a plurality of switches arranged in a three-dimensional array.

32. A three-dimensional switching device having a plurality of P logical switching layers, each of the logical layers receiving a plurality of M input signals and providing a plurality of N output signals, each input signal being directed along a path into said layer and each output signal being directed along a path out of said layer, each logical layer comprising: a plurality of switches arranged in a two-dimensional array, each of the switches being located at an intersection in which a projection of the path of one input signal meets a projection of the path of one output signal, wherein:
  at least two of said switches in each logical layer reside on distinct physical substrate layers in the switching device, and at least one of said signals travels through a penetrable zone of one of the physical substrate layers; and
  the logical layers are parallel to one another within the switching device and, in each logical layer, one switch is located at each intersection in which a projection of the path of one of the input signals meets a projection of the path of one the output signals.

33. The switching device of claim 32 wherein each switch resides on one of the physical substrate layers near a penetrable zone of that physical substrate layer, so that in at least one operative position of the switch a signal input to or output by the switch passes through that penetrable zone.

34. The switching device of claim 33 wherein each switch includes a mirror, the mirror not affecting any signal input to the switch when in a first position and reflecting any signal input to the switch when in a second position.

35. The switching device of claim 34 wherein, for each of the switches, when the mirror is in the second position any signal input to the switch is angled at 45° with respect to the mirror.

36. The switching device of claim 33 wherein each switch is a microelectromechanical (MEMS) switch.

37. The switching device of claim 36 wherein each MEMS switch comprises a generally planar switching element disposed in parallel to the surface of the physical substrate layer on which the switch resides and an actuator operatively engageable with the switching element for moving the switching element between different positions in a plane parallel to the surface of the physical substrate layer.

38. The switching device of claim 37 wherein the switching element of each MEMS switch comprises a mirror, the mirror not affecting any signal input to the switch when in a first position in said plane and reflecting any signal input to the switch when in a second position in said plane.

39. The switching device of claim 38 wherein, for each of the MEMS switches, any signal input to the switch is angled at 45° with respect to the mirror.

40. The switching device of claim 32 wherein the logical layers are parallel to one another within the switching device and for each logical layer:
  each input signal is denoted as an i'th input signal where i is an integer and $1 \leq i \leq M$ and each output signal is denoted as a j'th output signal where j is an integer and $1 \leq j \leq N$, the path of the first input signal and the path of the first output signal being in closest proximity among the input and output signal paths, the path of the M'th input signal and the path of the N'th output signal being most distant among the input and output signal paths, the paths of any intermediately denoted input signals being located incrementally between the first and M'th input signal paths, and the paths of any intermediately denoted output signals being located incrementally between the first and N'th output signal paths;

one switch in a first group of switches is located at each intersection in which a projection of the path of the i'th input signal meets a projection of the path of the j'th output signal for which the value of i+j for that intersection is less than or equal to max(M, N); and one switch in a second group of switches is located at each intersection in which the path of the i'th input signal meets the path of the j'th output signal for which the value of i+j for that intersection equals max(M, N)+1.

41. The switching device of claim 40 wherein for each logical layer:

each switch in the first group of switches resides on one of the physical substrate layers near a penetrable zone of that physical substrate layer, so that in at least one operative position of the switch a signal input to or output by the switch passes through that penetrable zone; and each switch in the second group of switches is located on the same physical layer and is static.

42. The switching device of claim 41 wherein for each logical layer:

each switch in the first group includes a mirror having first and second reflective surfaces, wherein when the mirror is in a first position the mirror does not affect any signal input to the switch, and when the mirror is in a second position the mirror reflects any signal input to the switch; and each switch in the second group includes a static mirror that reflects any signal input to the switch.

43. The switching device of claim 42 wherein for each of the switches in the first group, when the mirror thereof is in the first position any signal input to the switch is angled at 45° with respect to said mirror; and for each of the switches in the second group any signal input to the switch is angled at 45° with respect to the mirror thereof.

44. The switching device of claim 41 wherein each switch in the first group is a microelectromechanical (MEMS) switch.

45. The switching device of claim 44 wherein each MEMS switch in the first group comprises a generally planar switching element disposed in parallel to the surface of the physical substrate layer on which the switch resides and an actuator operatively engageable with the switching element for moving the switching element between different positions in a plane parallel to the surface of the physical substrate layer.

46. The switching device of claim wherein the switching element of each MEMS switch in the first group comprises a mirror having first and second reflective surfaces, the mirror not affecting any signal input to the switch when in a first position in said plane and reflecting any signal input to the switch when in a second position in said plane; and each switch in the second group includes a static mirror parallel to the surface of the physical substrate layer on which the switch resides that reflects any signal input to the switch.

47. The switching device of claim 46 wherein for each of the MEMS switches in the first group and each switch in the second group, any signal input to the switch is angled at 45° with respect to the mirror thereof.

48. A switching configuration comprising a first switching device as claimed in claim 32;

a second switching device as claimed in claim 32, wherein the number of logical layers in the second switching device equals the number of output signals in each logical layer of the first switching device, and wherein one and only one output from each logical layer of the first switching device is received as an input to a logical layer of the second switching device.

49. The switching configuration of claim 48 wherein the number of input and output signals in each logical layer of the second switching device equals the number of logical layers in the first switching device, within each switching device the logical layers are parallel to one another, and wherein the logical layers of the second switching device are positioned orthogonally with respect to the logical layers of the first switching device so that the paths of the output signals from the first switching device are colinear with the paths of the input signals of the second switching device.

50. A switching configuration comprising a first switching device as claimed in claim 32;

a second switching device as claimed in claim 32, wherein the number of logical layers in the second switching device equals the number of output signals in each logical layer of the first switching device, and wherein one and only one output from each logical layer of the first switching device is received as an input to a logical layer of the second switching device; and a third switching device as claimed in claim 32, wherein the number of logical layers in the third switching device equals the number of output signals in each logical layer of the second switching device, and wherein one and only one output from each logical layer of the second switching device is received as an input to a logical layer of the third switching device.

51. The switching configuration of claim 50 wherein the number of input and output signals in each logical layer of the second switching device equals the number of logical layers in the first switching device and the number of input and output signals in each logical layer of the third switching device equals the number of logical layers in the second switching device.

52. The switching configuration of claim 51 wherein within each switching device the logical layers are parallel to one another, and the logical layers of the second switching device are positioned orthogonally with respect to the logical layers of the first switching device so that the paths of the output signals from the first switching device are colinear with the paths of the input signals of the second switching device, and wherein the logical layers of the third switching device are positioned orthogonally with respect to the logical layers of the second switching device so that the paths of the output signals from the second switching device are colinear with the paths of the input signals of the third switching device.

53. The switching configuration of claim 52 wherein for each switching device:

in each logical layer, one switch is located at each intersection in which a projection of the path of one of the input signals meets a projection of the path of one of the output signals; and each switch resides on one of the physical substrate layers near a penetrable zone of that physical substrate layer, so that in at least one operative position of the switch a signal input to or output by the switch passes through that penetrable zone.

54. The switching configuration of claim 53 wherein for each switching device: each switch is a microelectromechanical (MEMS) switch comprising a mirror and the mirror of each MEMS switch is disposed in parallel to the surface of the physical substrate layer on which the switch resides and the switch further comprises an actuator operatively engageable with the switching element for moving the switching element between different positions in a plane parallel to the surface of the physical substrate layer.

55. The switching configuration of claim 52 wherein for each switching device:
   in each logical layer, each input signal is denoted as an i'th input signal where i is an integer and $1 \leq i \leq M$ and each output signal is denoted as a j'th output signal where j is an integer and $1 \leq j \leq N$, the path of the first input signal and the path of the first output signal being in closest proximity among the input and output signal paths, the path of the M'th input signal and the path of the N'th output signal being most distant among the input and output signal paths, the paths of any intermediately denoted input signals being located incrementally between the first and M'th input signal paths, and the paths of any intermediately denoted output signals being located incrementally between the first and N'th output signal paths;
   in each logical layer, one switch in a first group of switches is located at each intersection in which a projection of the path of the i'th input signal meets a projection of the path of the j'th output signal for which the value of i+j for that intersection is less than or equal to max(M, N); and
   in each logical layer, one switch in a second group of switches is located at each intersection in which the path of the i'th input signal meets the path of the j'th output signal for which the value of i+j for that intersection equals max(M, N)+1;
   each switch in the first group of switches resides on one of the physical substrate layers near a penetrable zone of that physical substrate layer, so that in at least one operative position of the switch a signal input to or output by the switch passes through that penetrable zone; and
   each switch in the second group of switches is located on the same physical layer and is static.

56. The switching configuration of claim 55 wherein for each switching device:
   each switch in the first group is a microelectromechanical (MEMS) switch comprising a mirror and the mirror of each MEMS switch is disposed in parallel to the surface of the physical substrate layer on which the switch resides and the switch further comprises an actuator operatively engageable with the switching element for moving the switching element between different positions in a plane parallel to the surface of the physical substrate layer; and
   each switch in the second group comprises a static mirror that is parallel to the surface of the physical substrate layer on which the switch resides.

57. A strictly non-blocking switching configuration comprising:
   a first switching configuration as claimed in claim 53 wherein for the first switching device in the first switching configuration each logical layer includes a second path for each output signal out of the logical layer, said second paths of the output signals being colinear with the paths of the input signals in that layer; and
   a second switching configuration as claimed in claim 53 wherein for the third switching device in the second switching configuration each logical layer includes a second path for each input signal into the logical layer, said second paths of the input signals being colinear with the paths of the output signals in that layer; and
   wherein the first and second switching configurations are positioned such that the second paths of the output signals from the first switching device of the first switching configuration are colinear with the paths of the input signals of the first switching device of the second switching configuration, and the paths of the output signals from the third switching device of the first switching configuration are colinear with the second paths of the input signals of the third switching device of the second switching configuration.

58. A method of fabricating the switching device of claim 34 comprising:
   fabricating the plurality of MEMS switches on a main substrate surface, the plurality of MEMS switches being arranged in P rows, the number of rows corresponding to the number of logical layers in the switching device, the plurality of MEMS switches on the main substrate surface being further divided into a plurality of sets of columns, the columns in each set being uniformly spaced and each set of columns being separated from an adjacent column by a space equaling that of a single column, each set of switches corresponding to the switches residing one of the physical substrate layers;
   separating the sets on the main substrate surface into the plurality of physical substrate layers;
   aligning the separated physical substrate layers to form the logical layers of the switching device; and
   bonding the physical substrate layers together.

59. The method of claim 58 wherein M equals N for each logical layer.

60. The method of claim 59 wherein the switching device comprises 2M-1 physical substrate layers and, with each set denoted as an a'th set where a is an integer and $1 \leq a \leq 2M-1$, the number of columns of switches in the a'th set is equal to (M-|M-a|).

61. The method of claim 59 wherein the switching device comprises M physical substrate layers and, with each set denoted as an a'th set where a is an integer and $1 \leq a \leq 2M-1$, the number of columns of switches in the a'th set is equal to a.

62. An optical device comprising:
   a first diffracting reflection grating having a plurality of diffraction elements on one side thereof;
   a second diffracting reflection grating having a plurality of diffraction elements on one side thereof,
   wherein the first and second diffracting reflection gratings are positioned in parallel with one another, separated by a distance w, so that the side of the first diffracting reflection grating having the diffraction elements opposes the side of the second diffracting reflection grating having the diffraction elements.

63. A method of wavelength division demultiplexing (WDM) using the optical device of claim 62 as a demultiplexer, comprising: directing a WDM signal at an initial input angle of incidence on to the diffraction elements of the first diffracting reflection grating so that the WDM signal is separated into a plurality of component wavelength signals each of which is reflected, at different angles, by the first diffracting reflection grating onto the diffraction elements of the second diffracting reflection grating and thereafter further reflected by the second diffracting reflection grating so that the plurality of component wavelength signals are output by the optical device in parallel and uniformly spaced from one another.

64. The method of claim 63 further comprising selecting the input angle of incidence and the distance w to provide a desired spacing of the component wavelength signals.

65. A method of wavelength division multiplexing (WDM) using the optical device of claim 62 as a multiplexer, comprising: directing a plurality of parallel and uniformly spaced component wavelength signals at a common initial input angle of incidence on to the diffraction elements of the first diffracting reflection grating so that each component wavelength signal is reflected, at different angles, by the first diffracting reflection grating onto the diffraction elements of the second diffracting reflection grating and thereafter further reflected by the second diffracting reflection grating into a single WDM signal.

66. The method of claim 65 further comprising selecting the input angle of incidence and the distance w to accommodate a particular spacing of the component wavelength signals.

67. A switching device comprising:

a first set of inputs for receiving a plurality of inputs signals;

a second set of inputs;

a third set of inputs;

a first set of outputs for providing a plurality of output signals; and a second set of outputs, wherein a signal provided at one of the second set of outputs is directed to a splitter which divides said signal into a first split signal and a second split signal, the first split signal being directed to an input in the second set of inputs and the second split signal being directed to an input in the third set of inputs.

68. A method of multicasting a multicast signal received at one of the first set of inputs in the switching device of claim 67 comprising:

(a) directing the multicast signal to one of the second set of outputs so that the multicast signal is received at one of the second set of inputs and at one of the third set of inputs;

(b) directing the multicast signal received at at least one of said one of the second set of inputs and said one of the third set of inputs to another of the second set of outputs so that the multicast signal is received at another of the second set of inputs and at another of the third set of inputs; and (c) repeating steps (a) and (b) until the desired number of multicast signals are received at inputs of said second and third sets of inputs.

* * * * *